Feb. 27, 1968  A. C. REYNOLDS, JR., ET AL  3,371,193
AUTOMATIC CARD READING SYSTEM
Filed May 22, 1962  12 Sheets-Sheet 1

INVENTORS
ANDREW C. REYNOLDS, JR
OLIVER H. CHALKER, JR
RAYMOND R. LUPKAS

BY
ATTORNEY

Feb. 27, 1968  A. C. REYNOLDS, JR., ETAL  3,371,193
AUTOMATIC CARD READING SYSTEM
Filed May 22, 1962  12 Sheets-Sheet 2
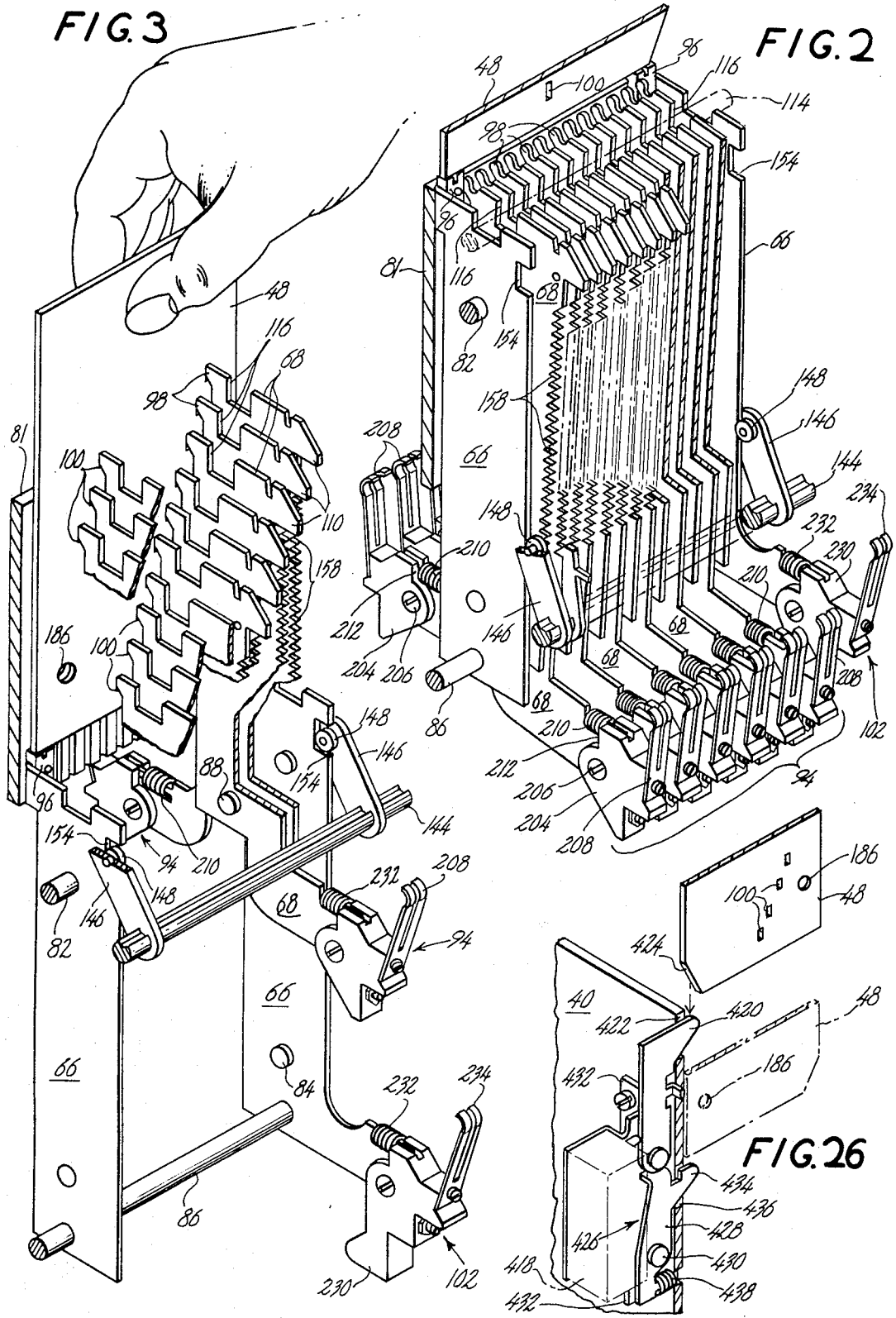

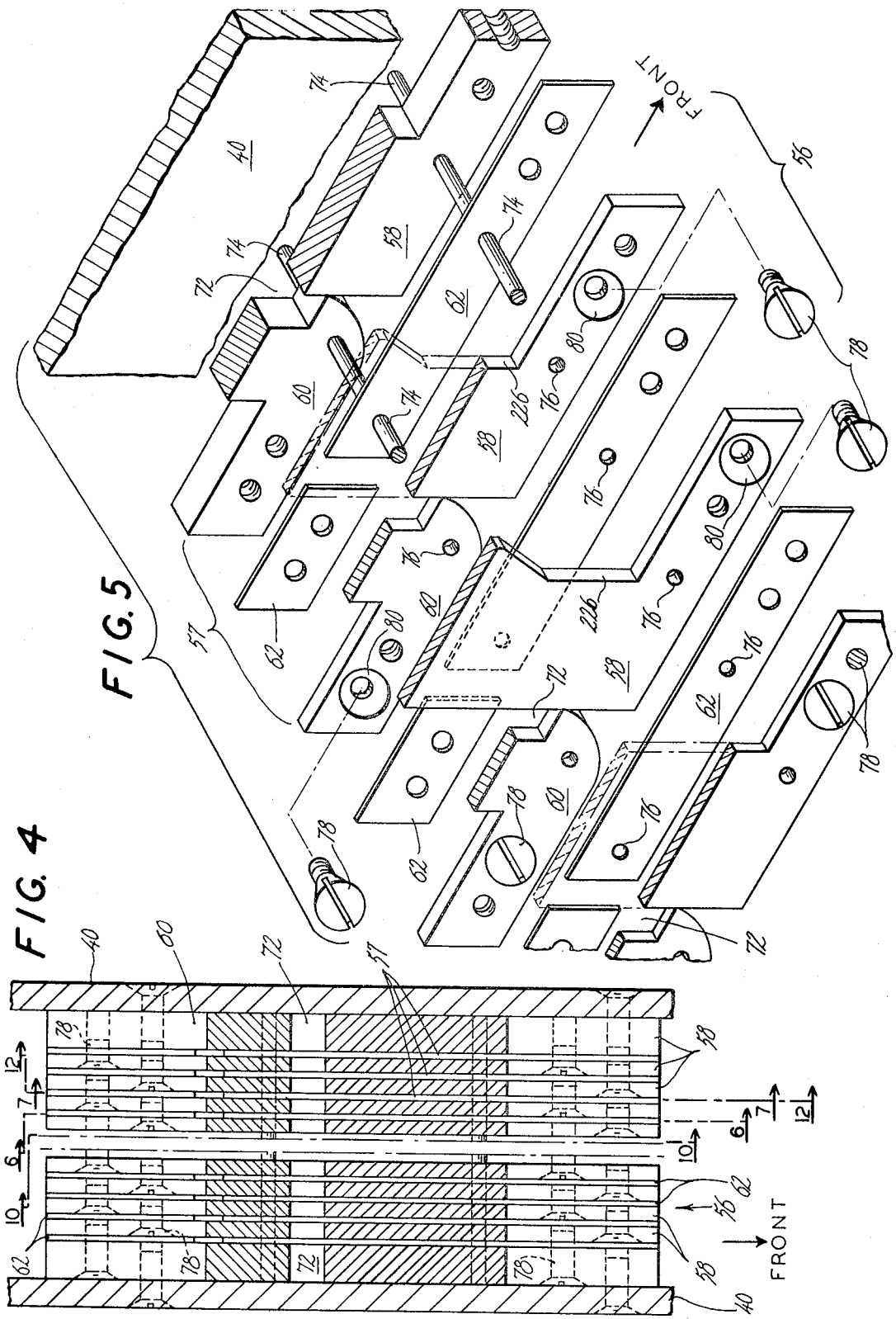

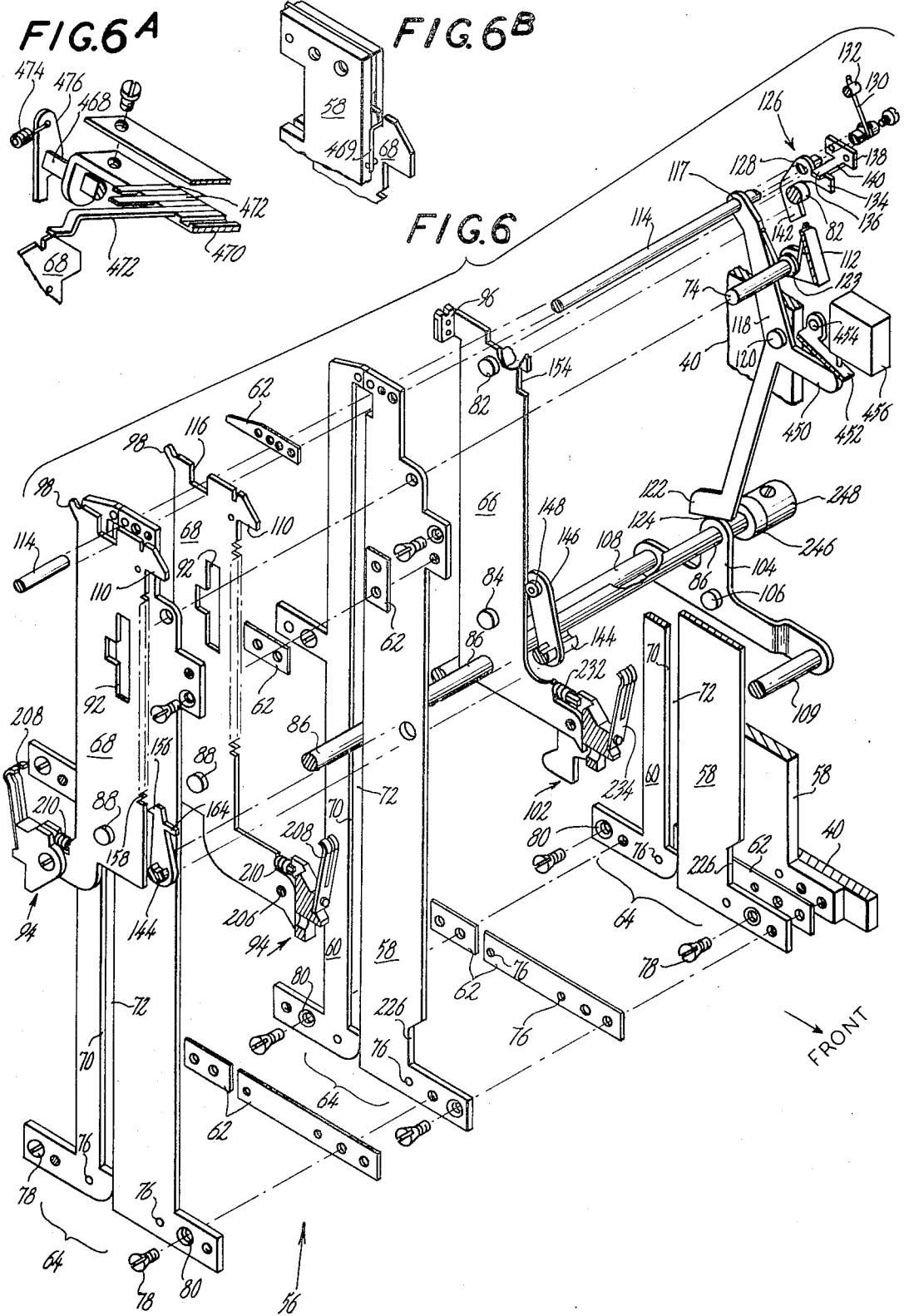

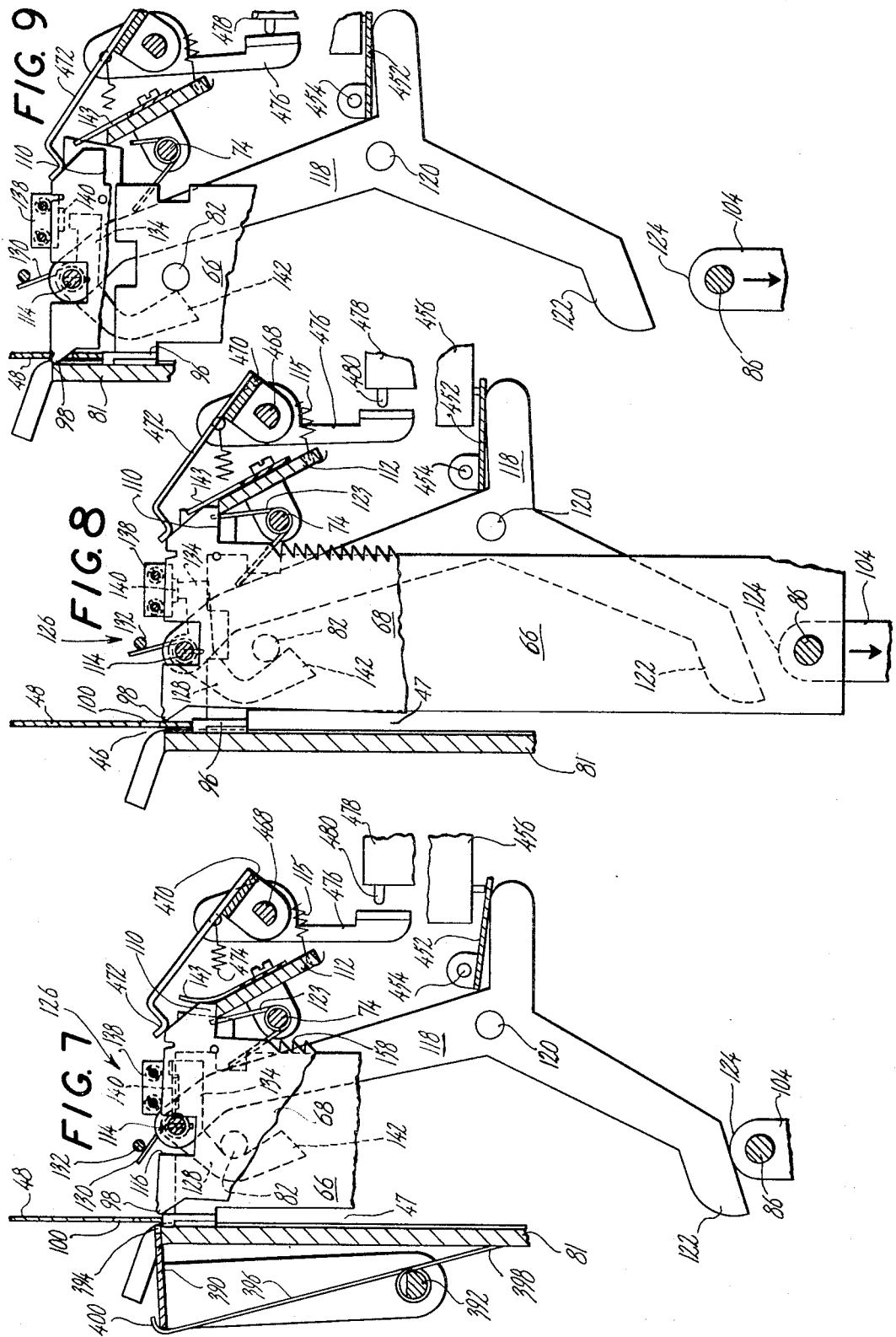

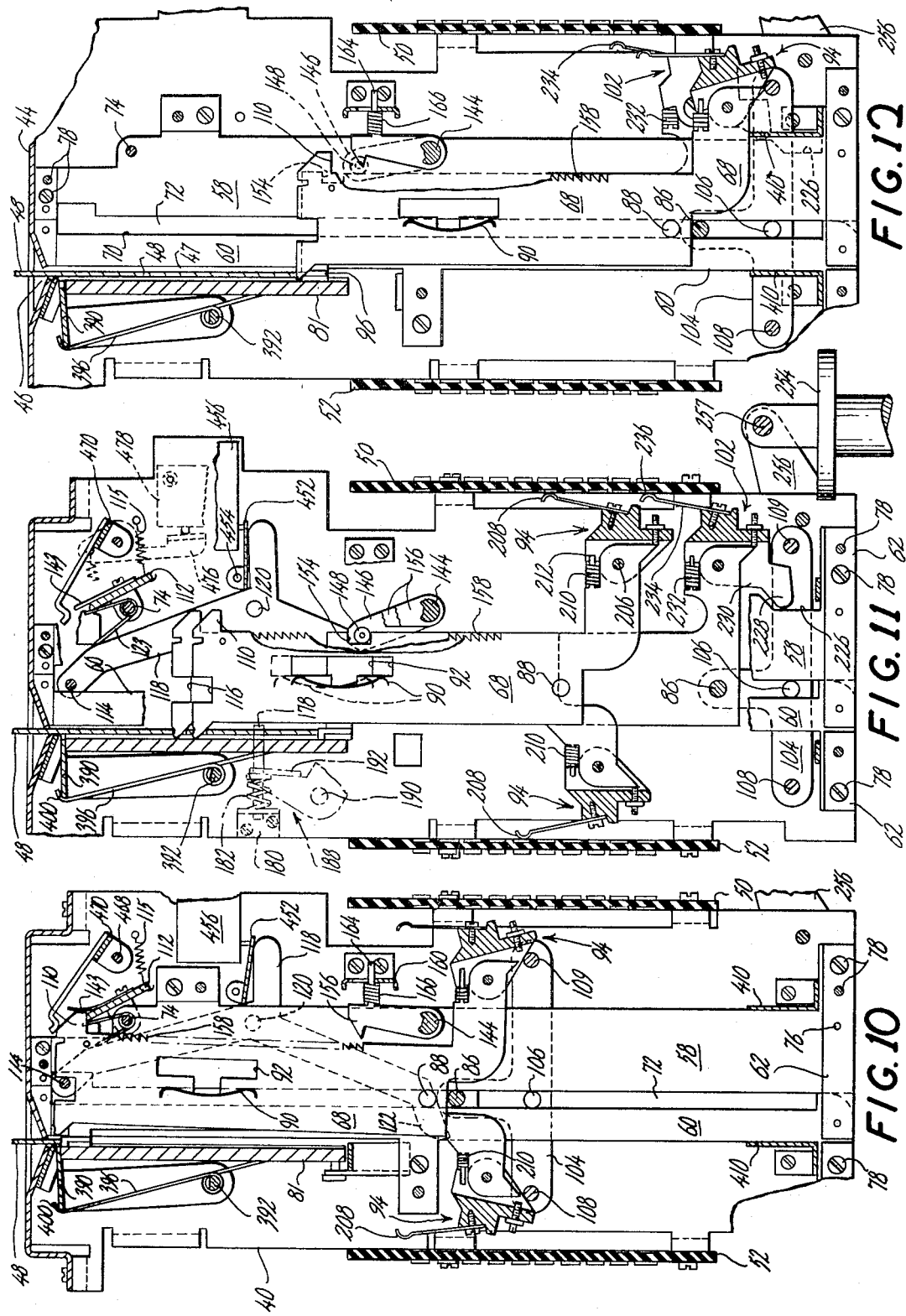

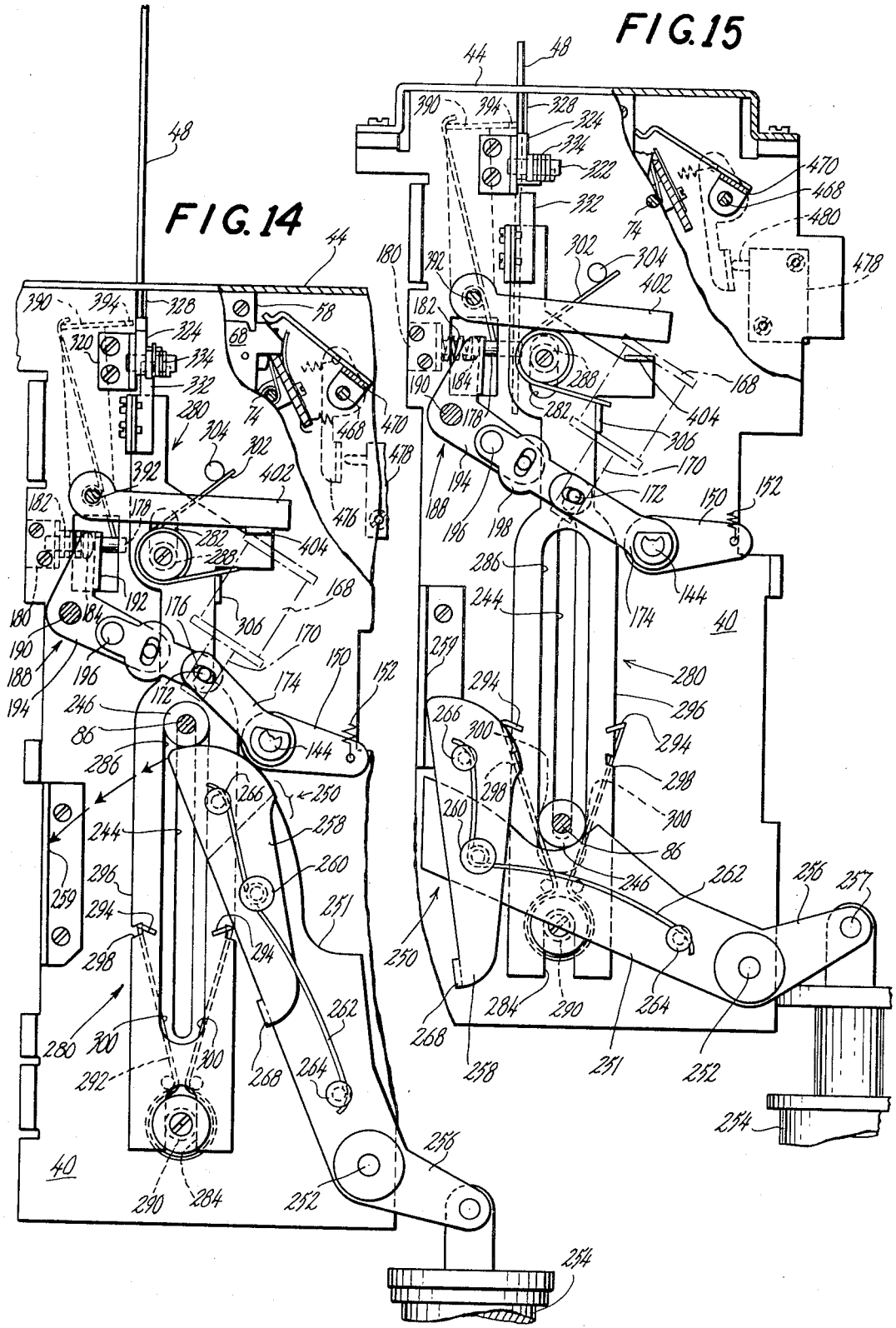

Feb. 27, 1968     A. C. REYNOLDS, JR., ETAL     3,371,193
AUTOMATIC CARD READING SYSTEM
Filed May 22, 1962                     12 Sheets-Sheet 9
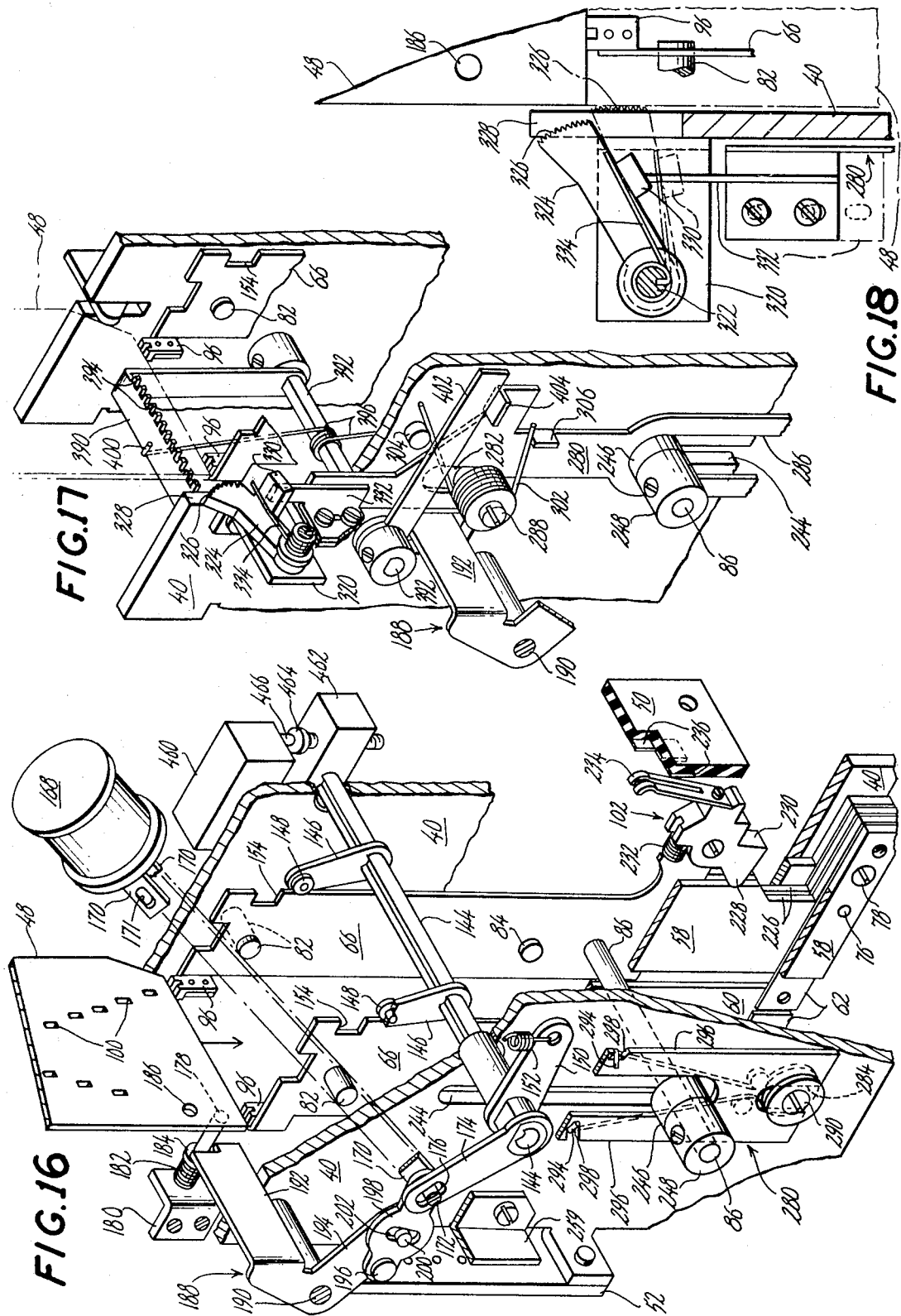

Feb. 27, 1968  A. C. REYNOLDS, JR., ETAL  3,371,193
AUTOMATIC CARD READING SYSTEM
Filed May 22, 1962  12 Sheets-Sheet 10
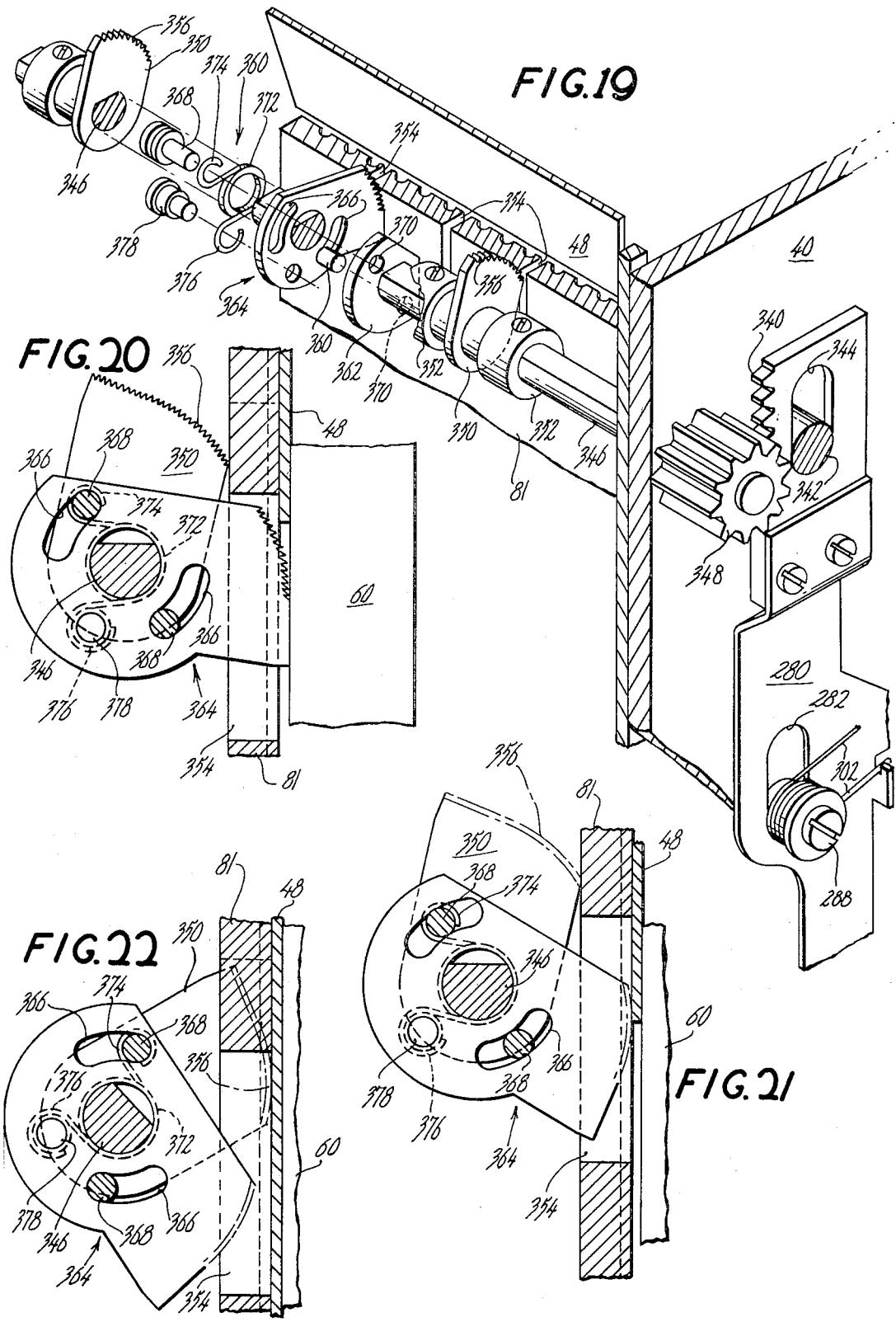

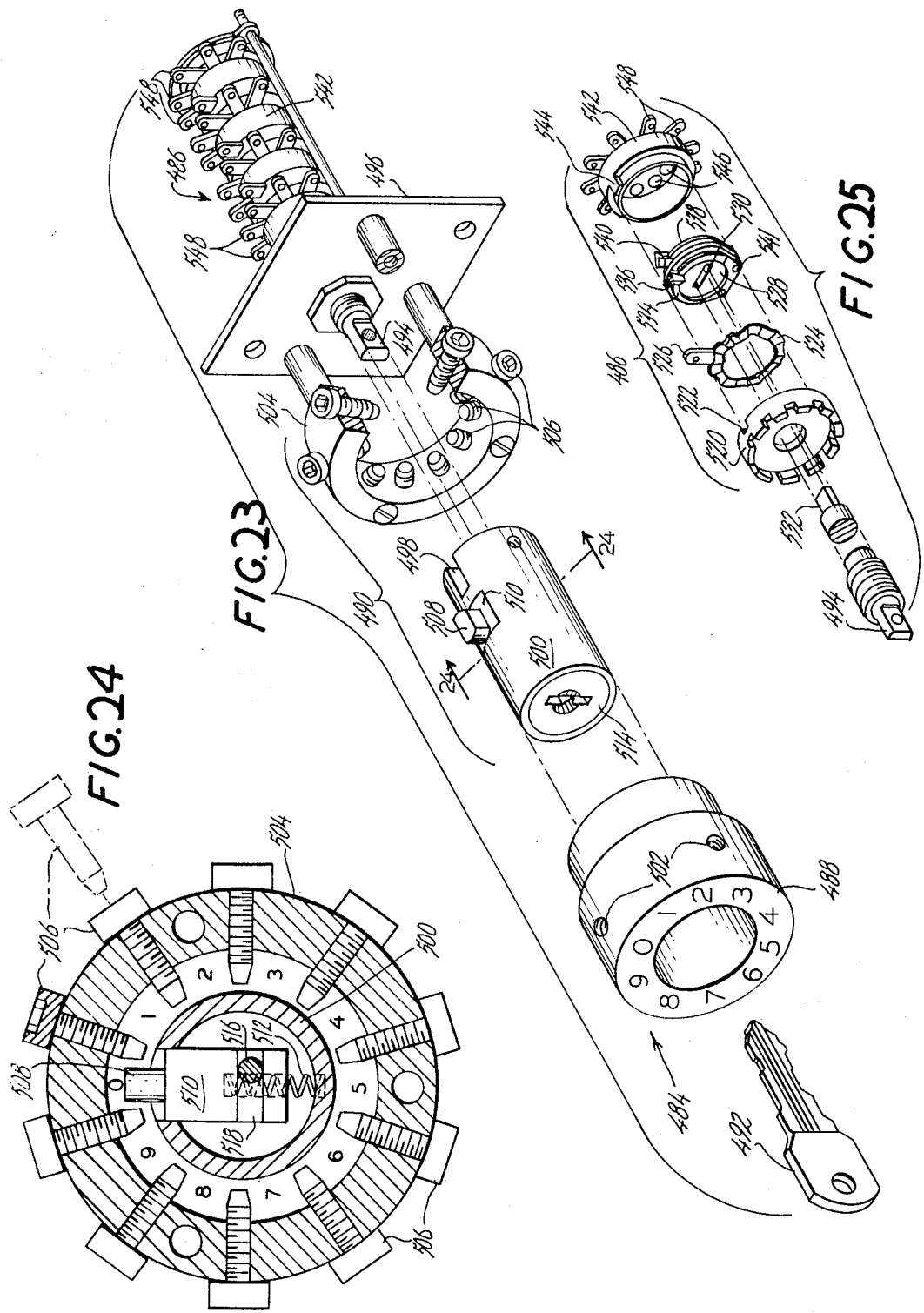

Feb. 27, 1968  A. C. REYNOLDS, JR., ETAL  3,371,193
AUTOMATIC CARD READING SYSTEM
Filed May 22, 1962  12 Sheets-Sheet 12

3,371,193
AUTOMATIC CARD READING SYSTEM
Andrew Craig Reynolds, Jr., Fort Wayne, Ind., and Oliver H. Chalker, Jr., Litchfield, and Raymond R. Lupkas, Waterbury, Conn., assignors, by mesne assignments, to Control Data Corporation, Minneapolis, Minn., a corporation of Minnesota
Continuation-in-part of application Ser. No. 863,227, Dec. 31, 1959. This application May 22, 1962, Ser. No. 196,672
20 Claims. (Cl. 235—61.11)

This application is a continuation-in-part of United States patent application No. 863,227, filed Dec. 31, 1959 by Reynolds et al.

The present invention is directed toward an apparatus for reading information recorded on documents, and in particular toward retrieving information from relatively rigid cards, the information having been pre-recorded in the form of punched holes laterally spaced in a plurality of columns. The invention is illustrated in the environment of a time recorder for use with a workman's identification badge in the form of a rigid card containing a plurality of punched holes to identify the workman in addition to the usual photograph, etc. Upon entering the plant, the workman inserts his identification badge into the card reader, which automatically reads the punched data on the badge, identifying the workman and his skills and transmitting the information to a suitable central data-storage device. In this embodiment, the present invention replaces ordinary time-clock systems.

With existing time-clock systems, individual cards for each worker are disposed in racks adjacent the time-clock. A worker arriving at the plant must select his own card and insert it in the machine where the card is stamped, then return the card to an appropriate rack. There are many objections to such a system. There is no guarantee against the workman inadvertently or deliberately selecting a wrong card. Since the workman must select his card from a large array presented by the storage racks, merely selecting the proper card takes a considerable amount of time and causes congestion around the time-clock. Furthermore, even after the correct card is selected, punched, and returned to the proper rack, the punched cards must be collected and the data recorded thereon must be transcribed into another form, perhaps several times, before it is available for use. The data is used not only for payroll purposes but also for determining the work force available in different skills, in order to prepare daily job assignments. Delay in making this information available results in workmen needlessly standing idle. Repetitive handling of the data in itself greatly increases the possibility of errors, and is expensive and time consuming.

Accordingly, it is an object of the invention to provide an automatic card reading system which may be readily incorporated into existing data-collection systems.

It is a further object of the invention to provide an automatic card-reading system of the above character particularly adapted for use as an attendance recorder, wherein the workman's badge also performs the function of a timecard.

It is a further object of the invention to provide a card-reading device of the above character which is compact and requires much less space than existing time-clock systems.

It is a further object of the invention to provide a card-reading device of the above character which is adapted for rapid data collection.

It is a further object of the invention to provide a card-reading device of the above character which is reliable and fool-proof in operation, and which is highly resistant to deliberate tampering or accidental errors in manipulation.

It is a further object of the invention to provide a card-reading device of the above character which is simple for the workman to manipulate.

It is a further object of the invention to provide a card-reading device of the above character which prevents withdrawal of the card until the card is fully inserted.

It is a further object of the invention to provide a card-reading device of the above character which locks the inserted card in the fully inserted position until the card is read.

It is a further object of the invention to provide a card-reading device of the above character wherein a portion of the card may be held in the hand while the card is being read.

The invention accordingly comprises the features of construction, combinations of elements and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIGURE 2 is a fragmentary perspective view of the sensing and control fingers inside the badge-reader, and illustrates the "restored" position of these elements when an inserted badge is just contacting the control finger tips.

FIGURE 3 is a fragmentary perspective similar to FIGURE 2, and illustrates the "reading" positions of the control and sensing fingers, when the badge is fully inserted and ready for reading.

FIGURE 4 is a horizontal sectional plan view taken on line 4—4 in FIGURE 1 of the apparatus used to support and guide the movement of the sensing and control fingers shown in FIGURES 2 and 3.

FIGURE 5 is an exploded fragmentary perspective view of a portion of the right-hand portion of the apparatus of FIGURE 4, and illustrates the method of assembly.

FIGURE 6 is an exploded fragmentary perspective view of the mechanism in the right side of the badge reader to the right of the line 6—6 in FIGURE 4, viewed from the upper left front corner, and shows how the sensing and control fingers are supported and arranged for their respective movements.

FIGURES 6A and 6B are fragmentary perspective views illustrating the manner in which the sensing fingers may be programmed.

FIGURE 7 is a fragmentary side elevation view taken on line 7—7 in FIGURE 4, showing one of the sensing fingers 68 as a card is inserted.

FIGURE 8 is a fragmentary side elevation view similar to FIGURE 7, and illustrates the sensing finger 68 just before its tip 98 enters a hole in the card.

FIGURE 9 is a fragmentary side elevation view similar to FIGURES 7 and 8, and illustrates the sensing finger tip 98 entering the hole in the card.

FIGURE 10 is a sectional side elevation view taken on line 10—10 of FIGURE 4 illustrating the sensing fingers in their restored position, and illustrating the alternate disposition of the brushes 94 on adjacent sensing fingers.

FIGURE 11 is a sectional side elevation view similar to FIGURE 10 and illustrates the sensing fingers 68 and control fingers 66 in their fully lowered position.

FIGURE 12 is a sectional side elevation view taken on line 12—12 in FIGURE 4 and illustrates one of the several means provided for preventing improper operation.

FIGURE 14 is a side elevation view, partially broken away, showing the left side of the badge reader in its restored position, and illustrating the restoring mechanism.

FIGURE 15 is a side elevation view similar to FIGURE 14, partially broken away showing the card-reader in its "reading" position.

FIGURE 16 is a fragmentary perspective view viewed from the upper left front corner, partially broken away, illustrating part of the restoring mechanism shown in FIGURES 14 and 15.

FIGURE 17 is a fragmentary perspective view of a portion of the mechanism just above that shown in FIGURE 16, showing several of the safety features of a first embodiment of the invention.

FIGURE 18 is a fragmentary front elevation of a portion of the mechanism shown in FIGURE 17.

FIGURE 19 is an exploded fragmentary perspective view of an alternative embodiment of the safety features shown in FIGURES 17 and 18, viewed from the left rear.

FIGURES 20 through 22 are fragmentary active front elevation views of a portion of the structure shown in FIGURE 19 at different stages in an operating cycle.

FIGURE 23 is an exploded perspective view of an auxiliary coding device.

FIGURE 24 is a sectional front elevation view taken along the line 24—24 in FIGURE 23.

FIGURE 25 is an exploded perspective view of part of the coding device shown in FIGURE 23.

FIGURE 26 is a fragmentary perspective view from the right rear of the badge orientation detector elements also shown in FIGURE 1.

Similar reference characteristics refer to similar parts throughout the several views of the drawings.

The card or badge which is to be read by the card-reader may also include the workman's photograph and other usual identification. The information which is to be read by the card-reader is preferably encoded on the card in the form of a plurality of punched holes laterally spaced in vertical columns. The vertical position of each hole in its column constitutes a bit of information which is to be read by the card-reader. Preferably, the card is laminated in or formed of a plastic material, the punched holes extending through the plastic cover and the card itself.

Figure 1:
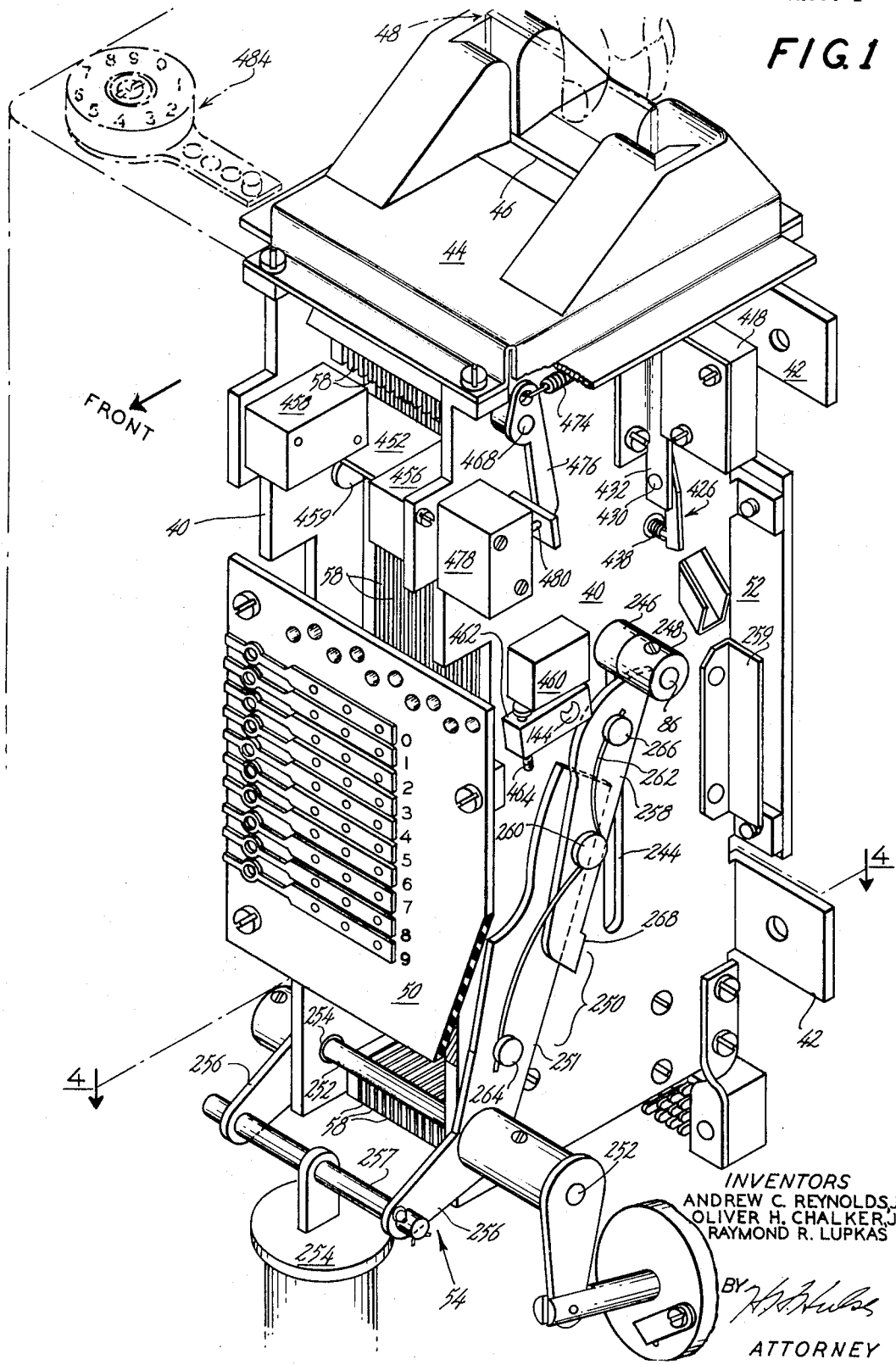
FIGURE 1 is a perspective view of a badge-reader incorporating the present invention.

In general, the badge reader as viewed in FIGURE 1 comprises a slot 46 opening into a vertical chamber 47 (FIGURE 8) for receiving a portion of the card 48 during the reading operation. Two control fingers 66 (FIGURES 2 and 3), are mounted for vertical sliding movement, one on each side of the chamber. The control fingers 66 have tips 96 protruding into the chamber for engagement with the lower edge of the card, which lowers the control fingers and initiates several control functions, as will be described. The reading function is performed by a plurality of sensing fingers 68, one for each data column on the card. The sensing fingers are supported immediately in front of the passage and are arranged for independent vertical sliding movement parallel to the path of movement of the card, from an initial "restored" position at the top of their travel (FIGURE 2) to a plurality of independent lower "reading" positions (FIGURE 3), to which the separate sensing fingers 68 are moved by engagement with the data holes 100 in the inserted badge or card.

The sensing fingers 68 are pivoted near their lower ends to permit a small degree of tilting movement. The upper rear corners of the sensing fingers are formed into sensing tips 98 for entry into the data holes 100 in the card. A brush assembly 94 is mounted on each sensing finger 68 near its lower end, and the various brushes make electrical connections corresponding to the data on the card 48 for electrically encoding the data for read out by the circuitry shown in FIGURE 27. The control fingers 66 and sensing fingers 68 are all slidably supported within the passageways of the "stackup" unit shown in FIGURES 4–6, and described in detail hereafter.

In their uppermost or "restored" position, prior to entry of the card 48, the sensing fingers 68 are held by latch assembly 126 (FIGURE 6) with their sensing tips 98 positioned adjacent the card chamber 47 (FIGURES 2 and 7). When a card 48 is inserted, the lower edge of the card engages the control finger tips 96, lowering the control fingers 66 (FIGURE 3). By mechanism to be described, this unlatches the sensing fingers 68 and permits them to pivot to the rear toward card 48, with the sensing finger tips 98 bearing on the face of the card 48. As each sensing finger tip 98 enters the data hole 100 in its corresponding column (FIGURE 9), that sensing finger 68 is freed for vertical sliding movement and is vertically positioned downwardly a distance corresponding to the ensuing downward travel of the corresponding data hole 100 on the card 48. When the card 48 is fully inserted to its lowermost or "reading" position (FIGURE 3), a brush assembly 102 on the right hand control finger 66 completes a circuit indicating that the card 48 is positioned for reading. In this fully inserted or "reading" position, a portion of the card 48 may project above slot 46 for continuous gripping by the user.

After the card is read, it may be manually withdrawn from the card reader, and means are provided for automatically restoring the sensing fingers 68 and the control fingers 66 to the "restored" position of FIGURE 2 after card withdrawal.

Referring now to FIGURE 1, the card-reader includes a pair of vertical, spaced side walls or frames 40 having mounting tabs 42 at the rear for mounting the card reader on a suitable support. A cover 44 is secured to the upper end of the frames, cover 44 including a slot 46 for receiving the badge 48. A pair of printed circuit boards 50 and 52 are mounted at the front and rear respectively of the frames 40, and a restoring mechanism 54 is located generally at the lower front corner of the card-reader.

*The stack-up*

Illustrated in FIGURES 4 through 6 is the stack-up 56, which forms spaced guide channels for the sliding control and sensing fingers. The stack-up 56 generally comprises a plurality of front up-rights 58, a like plurality of rear up-rights 60 and the various shims 62 necessary to space apart the adjacent pairs of up-rights sufficiently to provide front-to-rear channels 57 extending vertically over the height of stack up 56 to receive and support the control and sensing fingers for sliding movement. Each front up-right 58 is assembled with a corresponding rear up-right 60 to form a stack-up 64, the stack-up pairs 64 being separated from one another by suitable shims 62, in order to provide a plurality of vertical, laterally spaced passages 57 for sliding movement of control fingers 66 and sensing fingers 68. A relieved portion 70 (FIGURE 6) on each rear up-right 60, in combination with the rear surface of the corresponding front up-right 58, provides an aligned plurality of vertically and transversely extending guide channels 72 (FIGURE 4) adjacent the control and sensing fingers.

The stack-up elements are assembled with the aid of guide pins 74 which are inserted through guide holes 76 to facilitate alignment. As each pair 64 is placed in position, screws 78 are inserted through staggered countersunk holes 80, through matching holes in the shim elements, and threaded into threaded holes in the adjacent pair 64. The rear edges of rear up-rights 60 are aligned with the front edge of slot 46 (see FIGURE 12) and form with grooved sensing finger back plate 81 opposed walls defining a chamber 47 for receiving the badge.

The control fingers

Positioned in a pair of the passages 57 near the opposite sides of the card reader are a pair of control fingers 66 (FIGURES 2 and 6). Control fingers 66 have latch studs 82 rigidly fixed near their upper ends, inwardly projecting studs 84 rigidly fixed near their lower ends, and a control cross-shaft 86 rigidly connecting the two control fingers 66. Studs 82, 84, and control cross-shaft 86 are all vertically aligned and disposed in the guide channels 72 in the stack-up. Accordingly, control fingers 66 are arranged for vertical sliding movement, being guided laterally in passages 57 by the faces of up-rights 58 and 60 and being prevented from tilting in a plane parallel to the side frames 40 by the studs 82 and 84 and the control cross-shaft 86, all sliding in channels 72.

The sensing fingers

Sensing fingers 68 are disposed in each of the other passages 57, arrayed between the control fingers 66. Each sensing finger 68 has rigidly affixed thereto near its lower end a stud 88 which extends into the channels 72 on each side of the sensing finger 68. Sensing fingers 68 are laterally supported by the faces of the adjacent up-right pairs 64, and are guided by studs 88 sliding in channels 72. Accordingly, the sensing fingers 68 are supported and guided for vertical sliding movement in channels 57 between adjacent pairs 64 of stack-up elements 58 and 60 and sensing fingers 68 are also free for pivotal movement about studs 88.

Figure 13:
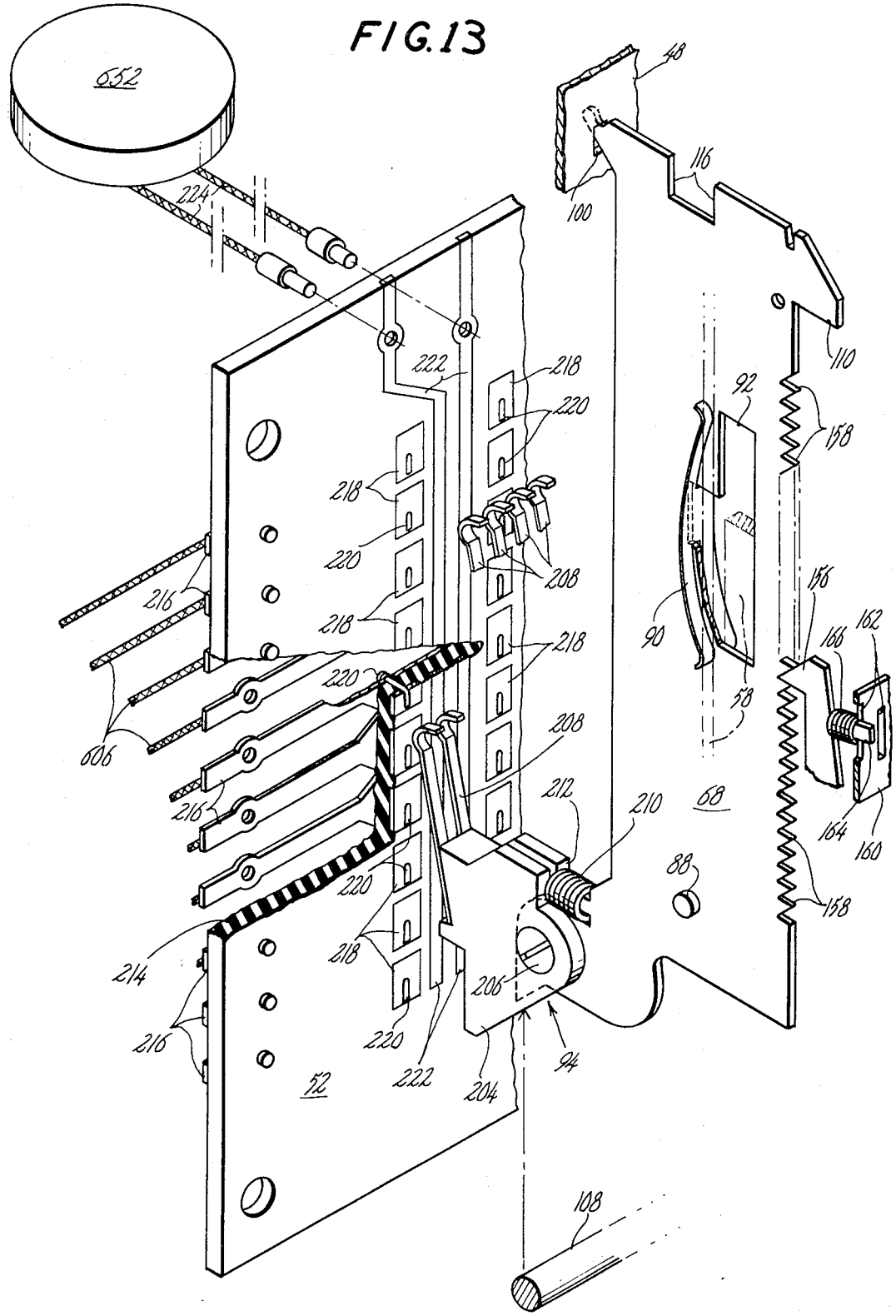
FIGURE 13 is an enlarged fragmentary perspective view, partially in section, and illustrates a single badge data hole in the process of being read by the extreme left-hand sensing finger 68 shown in FIGURE 2.

As shown in FIGURE 13, an H-shaped resilient leaf-spring 90 is positioned in a suitable slot 92 in the sensing finger, the four ends of spring 90 being disposed in the guide channels 72 and bearing against the rear edge of the front up-right members 58, to resiliently urge the upper end of sensing finger 68 toward the rear of the card-reader.

Each of the sensing fingers 68 carries a brush assembly 94 at its lower end, the brush assemblies 94 being alternately disposed to the front and rear of the card-reader, in order to establish contact with the corresponding columns of switch contacts on the printed circuit boards 50 and 52 (FIGURES 1, 2 and 11).

As shown in FIGURE 6, the upper rear corner of each control finger 66 is formed into a platform 96, while the upper rear corner of each sensing finger 68 is formed into a sensing tip 98, the sensing tips 98 being of such a shape and size as to fit in the data holes 100 in badge 48 (FIGURE 13). In addition, the lower front corner of the control finger 66 on the right side of the badge reader carries thereon a brush assembly 102.

The extreme positions of sensing fingers 68 and control fingers 66 are illustrated in FIGURES 2 and 3, wherein the stack-up 56 is omitted in order to show the movement of the control fingers 66 and sensing fingers 68. FIGURE 2 shows the control fingers and sensing fingers in the fully "restored" upper position, and shows the lower portion of a badge 48 as it is just being inserted in the badge reader. Platforms 96 on control fingers 66 are positioned in the path of the descending badge. Sensing tips 98 of sensing fingers 68, in the restored position illustrated in FIGURE 2, are supported by a mechanism to be described so that the descending badge 48 just clears the sensing tips 98. FIGURE 3 shows the badge 48 fully inserted, with the control fingers 66 having been carried down to their lowermost position, where the control brush assembly 102 closes the "reading" switch 234–236 (see FIGURE 27). The sensing fingers 68 are shown in FIGURE 3 arrayed vertically in their reading positions with their tips 98 engaging the holes 100 in the badge 48. During the lowering insertion of the badge 48 to its lowermost position, the successive engagement of the various sensing tips 98 has caused the sensing fingers 68 to be carried downwardly to these reading positions, which are determined solely by the vertical location of the corresponding holes 100 in badge 48.

Referring to FIGURE 6, control shaft 86, which is rigidly secured to and extends between control fingers 66, has rigidly attached thereto two T-shaped three-armed control links 104, one near each side frame 40. Each three armed link 104 has a guide stud 106 rigidly attached thereto directly below control cross-shaft 86. Control cross-shaft 86 and the guide studs 106 are both slidably positioned in the guide channels 72, and accordingly links 104 move vertically with control fingers 66.

Rigidly affixed between the links 104 are a rear brush control rod 108 and a front brush control rod 109. As may be seen in FIGURE 10, control cross-shaft 86 underlies and supports the sensing fingers 68 in the restored position while brush control rods 108 and 109 underlie and support the sensing finger brush assemblies.

In the restored position of FIGURE 2, the sensing fingers 68 are supported by the mechanism illustrated in FIGURES 6, 7 and 10. Aside from control cross-shaft 86, which underlies and supports sensing fingers 68 in the restored position, sensing fingers 68 have their forward upper corners formed in a shoulder 110 which rests on a transverse bail 112, the bail 112 being pivoted on an upper guide pin 74 spanning the space between the side frames 40. A latching shaft 114 parallel to guide pin 74 bears on the forward surface of a slot 116 formed in the top surfaces of sensing fingers 68, retaining sensing fingers 68 away from badge 48 in passage 47 and in a forward position against the urging of H-springs 90, thereby holding shoulders 110 engaged with bail 112. A coil spring 115 mounted under tension between side frame 40 and the lower end of bail 112 urges bail 112 counterclockwise about its pivot pin 74, toward shoulders 110 of sensing fingers 68.

Shaft 114 is rotatably mounted in an aperture 117 in a Y-shaped cam-out lever 118 (FIGURE 6), the cam-out lever 118 being centrally pivotally mounted by a pivot stud 120 to side frame 40. Inclined lower leg 122 on cam-out lever 118 bears on upper surface 124 of link 104 when the apparatus is in the fully restored position. This holds cam-out lever 118 rotated in a clockwise direction as viewed in FIGURE 6, with shaft 114 bearing against the front edge of all cut-outs 116, holding all sensing fingers 68 forward away from badge 48 until link 104 lowers. A hairpin spring 123, mounted on upper front guide pin 74 and having its ends bearing on cam-out lever 118 and bail 112, urges cam-out lever 118 counterclockwise when link 104 lowers. Another cam-out lever is mounted on the left of the reader.

The sensing finger latch

A latching mechanism generally indicated at 126 in FIGURE 6 retains latch shaft 114 in its forward or latched position. A latch member 128 is keyed on shaft 114 between cam-out lever 118 and side frame 40. A spring 130 is fixed to urge shaft 114 in the counterclockwise direction, spring 130 having one end attached to shaft 114 and its other end mounted on a stud 132 on side frame 40. Latch 128 has a generally horizontally extending arm 134 having a notch 136 in its upper surface. A plate 138 is attached to side frame 40, and includes a tab 140 mating with notch 136. Latch element 128 further includes a curved cam arm 142 which is positioned around the rear surface of stud 82 on control finger 66. Tab 140 fitting in notch 136 prevents latch element 128 and shaft 114 from moving rearward in order to free sensing fingers 68 until latch element 128 is rotated clockwise by stud 82 bearing on cam arm 142 upon the lowering of control finger 66. A comb spring 143 is mounted on bail 112 (see FIGURES 7–9), with the individual leaves bearing on the front edges of sensing fingers 68, in order to assist rearward movement of sensing fingers 68 when latch 128 releases shaft 114.

The pawl assembly

A pawl shaft 144 (FIGURE 16) is rotatably mounted in the central front portion of the side frames 40, in front of the sensing and control fingers. A pair of pawl control arms 146 are laterally aligned with the control fingers 66, and each has one end keyed to pawl shaft 144 and a roller 148 mounted on its other end bearing on its respective control finger. Control arms 146 are biased into contact with control fingers 66 by a crank 150 having one end keyed to pawl shaft 144 and the other end attached to tension coil spring 152, the other end of spring 152 being anchored to side frame 40. The forward surfaces of control fingers 66 are provided with notches 154 (FIGURES 3, 11 and 16) into which rollers 148 drop when control fingers 66 are at the lowermost limit of their vertical travel. When rollers 148 drop into notches 154, pawl shaft 144 rotates counterclockwise.

Referring now to FIGURES 10 and 12, pawl shaft 144 also has keyed thereon between arms 146, a plurality of pawls 156, each in alignment with one sensing finger 68. As indicated in FIGURE 12, pawl 156 is mounted on shaft 144 slightly offset from the angle at which arm 146 is mounted, whereby the pawl tip clears the sensing fingers so long as rollers 148 are not in notches 154, i.e., as long as control fingers 66 are not in their fully lowered position. The front edges of sensing fingers 68 are provided with notches 158 for receiving pawls 156. In front of the pawls 156, as shown in FIGURES 12 and 13, a slotted plate 160 extends transversely between side frames 40, the slots 162 in plate 160 (FIGURE 13) being positioned to receive forwardly-projecting guide tabs 164 on pawls 156. A compression coil spring 166 is mounted on each tab 164, compressed between pawl 156 and slotted plate 160, and spring 166 urges pawls 156 toward notches 158 in the sensing fingers 68. Accordingly, when the card is inserted fully, rollers 148 drop into notches 154, permitting pawl shaft 144 to rotate counterclockwise. This carries pawls 156 rearwardly into engagement with notches 158 on sensing fingers 68, positively locking sensing fingers 68 in their lowered "reading" position until pawls 156 are withdrawn. Pawls 156 upon engaging notches 158 insure accurate positioning of sensing fingers 68.

While badge 48 is in the reading position, brush assemblies 94 on sensing fingers 68 complete circuits on printed circuit boards 50 and 52 corresponding to the data on badge 48 whereupon the scanning circuitry shown in FIGURE 27 sequentially scans the printed circuit boards 50 and 52 as will be more particularly described below.

Referring to FIGURE 16, pawls 156 are withdrawn after the reading operation by an unlatching solenoid 168, mounted on the left frame 40 near pawl shaft 144, as indicated in FIGURES 14 and 15, and shown in an exploded position in FIGURE 16. Solenoid 168 when energized withdraws a pair of parallel spaced arms 170, there being a pin 172 bridging arms 170. A crank link 174 has one end keyed to shaft 144 and a slot 176 in its other end fitted over pin 172. Operation of solenoid 168 withdraws arms 170, which causes link 174 and pawl shaft 144 to rotate in a clockwise direction, withdrawing rollers 148 from slot 154 in the control fingers 66 and withdrawing pawls 156 from notches 158 in the sensing fingers 68. Pin 172 is mounted in elongated slots 171 in solenoid arms 170, the slots 171 permitting a small amount of free travel of the solenoid armature before lever 174 is moved, permitting a load free start for solenoid 168.

The card lock

An optional card locking arrangement is provided in the central rear portion of the badge reader to positively lock the card in its fully inserted position during the reading operation. Referring to FIGURE 16, the card locking arrangement includes a pin 178 mounted to the rear of transverse plate 81, as shown in FIGURE 11, by a bracket 180 attached to the left frame wall 40 (FIGURE 16). Pin 178 is spring urged toward card 48 by a compression coil spring 182 mounted thereon between bracket 180 and an enlarged flange 184 on pin 178. The pin 178 is free for movement toward the card, and extends through a mating aperture 185 in plate 81 (FIGURE 11). In this embodiment, card 48 has a mating aperture 186 which is aligned with pin 178 when card 48 is in its fully inserted position.

When the optional card locking arrangement is not provided, the pawls 156 provide a "memory" feature by retaining the sensing fingers 68 in position even though the badge 48 is withdrawn.

A crank 188 is mounted by pivot 190 to left frame 40 for urging pin 178 rearwardly out of engagement with aperture 186 when unlatching solenoid 168 is energized. As shown in the upper left portion of FIGURE 16, crank 188 includes an arm 192 which engages flange 184 on pin 178 when crank 188 is rotated in the counterclockwise direction, and a further arm 194 which carries a pivot pin 196 for adjustable connecting link 198. A locking pin 200 is mounted on arm 194 for locking link 198 to arm 194. Pin 200 extends into a slotted aperture 202 in link 198. The forward end of link 198 is mounted on pin 172.

The data encoder

The brush assemblies 94 carried by sensing fingers 68 (FIGURE 13) comprise a block 204 pivotally mounted by a pivot 206 at one lower corner of sensing finger 68. Block 204 carries a bifurcated brush 208 (best seen in FIGURE 2), for cooperation with one of the printed circuit boards 50 and 52. The sensing finger 68 illustrated in FIGURE 13 has its brush 208 contacting printed circuit board 52 mounted at the rear of the card-reader. A compression spring 210 is mounted between a shoulder 212 on block 204 and the sensing finger 68, to resiliently urge brush 208 into contact with the surface of printed circuit board 52.

Printed circuit board 52 has thereon a plurality of contacts which are bridged by bifurcated brushes 208, to permit electrical readout of the information contained on the punched card 48. Circuit board 52 comprises a base of insulating material 214 having on the side away from the badge reader a plurality of horizontally extending electrically conducting output elements 216, ten as illustrated. Each element 216 is connected to a corresponding horizontally extending series of contacts 218 by electrically conducting rivets 220. Contacts 218 each connected to a different element 216, are arranged in vertical columns facing brushes 208. A plurality of conductive scanning strips 222 are disposed between the vertical columns of contacts 218, there being a scanning strip 222 aligned with one arm of each bifurcated brush 208. Strips 222 are connected to a like plurality of scanning conductors 224 by a suitable connector or plug arrangement. In each of its "reading" positions, each bifurcated brush 208 connects its corresponding scanning strip 222 with one of the contacts 218 in an adjacent column, according to the vertical position of the associated sensing finger 68.

The read signal

To activate or produce an initiating signal for the "reading" operation, an arrangement is provided whereby the badge reader determines when the badge is fully inserted, and this is illustrated in FIGURE 16. As shown therein, the front stack-up elements 58 adjacent to the right hand control finger 66 have formed therein near their lower ends a notch 226. A bifurcated brush assembly 102 is carried by the right hand control finger, and is generally similar to the brush assemblies 94 carried by the sensing fingers, except for a lobe 228 formed on the lower rear surface of brush block 230. Lobe 228 rides on the front edge surfaces of stack-up elements 58, and holds brush assembly 102 rotated counterclockwise as viewed in FIGURE 16 until control finger 66 lowers far enough for lobe 228 to drop into notch 226. At this time, a compression spring 232 generally similar to spring 210 in the sensing brush assemblies, rotates block 230 in the clockwise direction, lowering bifurcated brush 234 to bridge a spaced pair of contacts 236 carried on front circuit board 50, which signals that the control fingers 66 are fully lowered and accordingly that badge 48 is fully inserted and is properly positioned for "reading." Aside from the additional pair of contacts 236, front circuit board 50 is similar to rear board 52.

*The restoring mechanism*

The mechanism 54 for restoring the card reader after a badge has been inserted and read is shown in FIGURES 1, 14 and 15. This restoring mechanism includes the control cross-shaft 86 raised from its "reading" position of FIGURE 3 to its restored position of FIGURE 2 by the lifting action of a restoring cam element 250 (FIGURE 1). Upward movement of shaft 86 carries with it the control and sensing fingers, as shown in FIGURES 3 and 11.

Control cross-shaft 86 (FIGURE 1) extends through slots 244 in each of side frames 40, and has secured at each end thereof a roller 246 rotatably mounted on shaft 86 and an end collar 248 rigidly secured to shaft 86. Identical split cams 250 are pivotally mounted on each end of shaft 252 which extends through apertures 254 in frames 40, and accordingly only the cam 250 on the left side of the badge reader will be described. A solenoid 254 is attached to arm 256 on split cam 250 by a link 257, and as viewed in FIGURE 15, rotates split cam 250 clockwise about pivot shaft 252 upon energization.

Due to space limitations, the length of cam required to fully restore control cross-shaft 86 to the reset position would conflict with the mounting for circuit board 52. Accordingly, the main body portion 251 of cam 250 has a cam extension segment 258 pivotally mounted thereon by pivot pin 260. A wire coil spring 262 is provided with extension arms extending behind pin 264 on cam 251 and pin 266 on cam segment 258. Spring 262 continually biases cam segment 258 toward its extended position, illustrated in FIGURE 14. Cam segment 258 has formed thereon a tab 268 which contacts the lower surface of cam body 251 to limit counterclockwise rotation of cam segment 258 relative to main cam body 251 as viewed in FIGURE 15. The upper surfaces for cam body 251 and cam segment 258 are so formed that they present a smooth, continuous curve to roller 246 when cam segment 258 is in its extended or counterclockwise position relative to cam 251.

When cross-shaft 86 is lowered by insertion of a badge 48, roller 246 bears on segment 258 initially and rotates the entire cam assembly rearwardly. As roller 246 leaves cam segment 258 and bears on cam body 251, the rear tip of cam segment 258 engages mounting tab 259. As cam body 250 is further depressed, cam segment 258 pivots clockwise relative to cam body 251, as shown in FIGURE 15, with the tip of cam segment 258 sliding downward along the forward surface of tab 259.

*The control slide*

As shown in FIGURES 14 and 15, a vertically elongated and slotted control slide 280 is mounted on left side frame 40 for vertical sliding movement between an upper position shown in FIGURE 14 and the lower position shown in FIGURE 15. This vertical movement of slide 280 actuated by insertion of a badge and by the restoring operation, is employed to prevent the transmission of erroneous data due to faulty manipulation of the card, and to prevent insertion of a second badge before the card-reader is fully restored. Control slide 280 has formed thereon vertical slots 282, 284 and 286. A pair of guide studs 288 and 290 extend from side wall 40 through end slots 282 and 284 respectively. The elongated central slot 286 is aligned with slot 244 in left frame 40 through which control cross-shaft 86 extends, and as viewed in FIGURES 14 and 15, slot 286 is wide enough to accommodate roller 246 mounted on control cross-shaft 86. When the badge reader is in its uppermost or restored position, as shown in FIGURE 14, the upper end of slot 286 is supported by roller 246.

A hairpin spring 292 is mounted on pin 290 between slide 280 and frame 40, and has its free ends formed into latching hooks 294 which are resiliently urged against the side edge surfaces 296 of control slide 280 by the resilience of spring 292. A pair of notches 298 are formed in the surfaces 296 of control slide 280 for receiving hooks 294 when control slide 280 is in its uppermost or restored position. Hairpin spring 292 has portions 300 which extend convergingly across a lower portion of slot 286, whereby when control cross-shaft 86 is lowered, roller 246 spreads the converging portions 300 of hairpin spring 292, camming hook portions 294 out of notches 298. A torsion spring 302, mounted on stud 288, has one end bearing on a stud 304 protruding from side frame 40 and its other end bearing on a tab 306 extending from control slide 280, in order to continuously urge control slide 280 downwardly.

Accordingly, when the badge reader is in its restored position, control slide 280 is supported in its uppermost position by roller 246 bearing on the upper end of slot 286 and by hooks 294 on hairpin spring 292 engaged in notches 298, as shown in FIGURE 14. When a badge has been partially inserted, lowering control cross-shaft 86 and roller 246, control slide 280 is retained in its uppermost position by hooks 294 engaging notches 298. As control cross-shaft 86 and roller 246 approach the lower limit of their travel, roller 246 spreads portions 300 of hairpin spring 292, camming hooks 294 out of notches 298 and permitting control slide 280 to descend under the urging of spring 302 to the position illustrated in FIGURE 15. When the badge reader is restored, the first upward movement of control cross-shaft 86 and roller 246 permits hooks 294 on spring 292 to move toward each other, so that hooks 294 engage the side surfaces 296 of control slide 280. As shaft 86 nears the upper limit of its travel, roller 246 engages the upper surface of slot 286 and lifts slide 280 to its uppermost position. At this time, hooks 294 drop into notches 298.

*The anti-in cam*

In order to prevent full insertion of the badge followed by a partial withdrawal and reinsertion, which could give erroneous readings if the badge reader were not restored in the meantime, means are provided for preventing such partial withdrawal and reinsertion until the badge reader has been fully restored. Such a mechanism is illustrated in FIGURES 17 and 18. The left frame 40 has a bracket 320 mounted thereon near cover 44, bracket 320 carrying a stud 322. A cam 324 is pivotally mounted on stud 322, and has a serrated cam surface 326 extending through a slot 328 in frame 40. Slot 328 is aligned with the edge of the badge. A tab 330 on cam 324 is positioned in the path of movement of finger 332 on slide 280. Cam 324 is urged inwardly toward the card by a spring 334, one end of spring 334 being secured to the stud 332 and the other end bearing on tab 330.

When slide 280 is in its uppermost or restored position, tab 330 on cam 324 is engaged by finger 332 on slide 280, holding cam 324 in its upper position against the urging of spring 334. When control slide 280 is lowered, finger 332 carried thereon lowers, permitting cam 324 to rotate under the urging of spring 334 into engagement with the edge of card 48. When this occurs, badge 48 is already fully inserted in the badge reader. Due to the camming action of cam 324, badge 48 may be withdrawn from the card-reader, but may not be reinserted or partially withdrawn and reinserted until cam 324 is rotated upwardly by restoration of control slide 280.

The anti-out cam

Alternative to the cam arrangement of FIGURE 18, whereby the serrated cam surface engages an edge of badge 48, the embodiment illustrated in FIGURES 19–22 may be used. In this embodiment, a rack 340 is secured to control slide 280 by suitable attaching means, such as by the screws illustrated in FIGURE 19. A pin 342, secured to left side frame 40, rides in a slot 344 in rack 340 and supports and guides rack 340. A shaft 346 is journalled in both side frames 40, and has rigidly secured thereto outside of left frame 40 a pinion gear 348 which is meshed with rack 340. Accordingly, vertical movement of slide 280 causes rotation of shaft 346 through a small arc (in the device illustrated, approximately 45°). A pair of anti-in cams 350 are keyed to shaft 346 and are mounted between side frames 40. Anti-in cams 350 are supported laterally by suitable collars 352 which are rigidly mounted on shaft 346.

Shaft 346 is mounted in the badge reader just to the rear of sensing finger back-plate 81. Suitable slots 354 are provided in sensing finger back-plate 81 aligned with the various cams mounted on shaft 346 whereby the cams may extend through back-plate 81 and contact the back surface of badge 48. As illustrated in FIGURES 20 and 21, when the control slide 280 is in its uppermost or restored position, anti-in cams 350 are held rotated rearwardly and out of engagement with the surface of badge 48. When badge 48 is fully inserted in the badge reader and slide 280 lowers, shaft 346 is rotated clockwise to the position illustrated in FIGURE 22, with the serrated edge 356 engaging the back surface of badge 48. Accordingly, badge 48 may be withdrawn but may not be reinserted due to the camming action of anti-in cam 350.

In order to insure complete insertion of badge 48, an anti-out mechanism 360 is also mounted on shaft 346. Assembly 360 includes a disc 362 rigidly mounted on shaft 346 and anti-out cam 364 rotatably mounted on shaft 346 adjacent disc 362. Anti-out cam 364 has formed therein a pair of diametrically opposed arcuate slots 366. A pair of anchor studs 368 extend through arcuate slots 366 and are secured in mating apertures 370 in disc 362. Accordingly, anti-out cam 364 may rotate through a small arc relative to shaft 346. A torsion spring 372 is mounted on shaft 346 and has one end 374 anchored to one of the studs 368. The other end 376 of spring 372 is anchored to a stud 378 which is rigidly mounted on anti-out cam 364. As viewed in FIGURE 20, spring 372 therefore urges anti-out cam 364 in the counterclockwise direction.

When the control slide 280 is in its uppermost or restored position, anti-out cam 364 extends through a suitable slot 354 in sensing finger back-plate 81 into the passageway for badge 48. FIGURE 20 shows a badge 48 which has been inserted in the badge reader but has not yet reached the anti-out cam 364. As the badge is further inserted (FIGURE 21), the lower edge of the badge engages cam 364 and rotates cam 364 slightly clockwise against the urging of spring 372. At this stage, badge 48 may be further inserted, but due to the camming action of anti-out cam 364, may not be withdrawn until shaft 346 is rotated by lowering of control slide 280. When control slide 280 is lowered by full insertion of badge 48, shaft 346 rotates to the position shown in FIGURE 22, during which pins 368 engage the ends of arcuate slots 366 and rotate anti-out cam 364 clockwise sufficiently that serrated edge 380 no longer engages badge 48. Accordingly, anti-out cam 364 prevents withdrawal of badge 48 before it has been fully inserted and control slide 280 has lowered.

The card gate

A card gate assembly is illustrated in FIGURE 17, wherein sensing finger back-plate 81 is omitted in order to more clearly show the structure of the card gate assembly. A card gate 390 is keyed onto shaft 392 which is rotatably mounted in side frames 40. As may be seen in FIGURE 7, card gate 390 and shaft 392 are positioned just to the rear of sensing finger plate 81, with the teeth 394 on card gate 390 just clearing the top of sensing finger back plate 81. A torsion spring 396 is mounted on shaft 392, and has one end 398 abutting plate 81 and its other end 400 hooked around the back edge of card gate 390. Accordingly, spring 396 biases card gate 390 toward the card passage. A crank 402 is mounted outside of left frame 40 and is keyed on shaft 392. Underlying crank 402 is a tab 404 formed on control slide 280.

When control slide 280 is in its restored or uppermost position, tab 404 (bearing on crank 402) maintains card gate 390 rotated to the rear. When control slide 280 is in its lowered position, tab 404 is lowered from engagement with lever 402 and card gate 390 is freed for rotation under the urging of spring 396 into engagement with the rear surface of the badge 48. When badge 48 is removed, card gate 390 pivots forward and blocks the badge passage, preventing insertion of a badge 48 until the badge reader restores.

The limit bars

A pair of transverse limit bars 410 are secured to stack-up elements 58 and 60 for limiting the extent of downward travel of sensing fingers 68 (FIGURES 10 and 12). Limit bars 410 extend laterally beneath sensing fingers 68, but do not extend under control fingers 66. If a badge 48 is partially inserted far enough to unlatch the sensing fingers 68 and then fully withdrawn, the badge reader will automatically reset as will be more fully explained below. However, if the badge 48 is merely partially withdrawn far enough for the lower edge of badge 48 to clear the tips 98 of one or more of sensing fingers 68, and is then reinserted with the lower edge of badge 48 bearing on a sensing tip 98, a lower edge of the corresponding sensing finger 68 will encounter one of the limit bars 410 (FIGURE 12), preventing further lowering of badge 48. When a sensing finger 68 thus encounters a limit bar 410, badge 48 is prevented from lowering right control finger 66 sufficiently for bifurcated brush 234 to bridge contacts 236. As is explained below, the badge reader will automatically reset when the badge 48 is removed without transmitting erroneous data, since data transmission is initiated only by brush 234 bridging contacts 236.

The badge corner detectors

Referring to FIGURE 26, there is shown a mechanism for insuring that the badge is properly inserted into the badge reader. A normally closed card-in switch 418 is mounted near the upper edge of right frame 40, and has its operating arm 420 extending through a slot 422 inside frame 40 into the path of the descending card or badge 48. Badge 48 has one corner cut at an angle to provide an inclined corner 424, which engages and cams or wedges operating arm 420 out of the card passage when badge 48 is properly inserted with inclined corner 424 presented to operating arm 420.

To prevent erroneous data transmission if an uncut corner on badge 48 were manipulated past the upper corner detector, a second corner detector 426 is located below arm 420, and includes an arm 428 pivoted at 430 on a tab 432 mounted on right side frame 40. A detecting tip 434 on the upper end of arm 428 extends through a slot 436 in right side frame 40 into the passage of the badge 48. Corner detecting tip 434 is continuously urged into the card passage by coil spring 438 mounted between side frame 40 and the lower end of arm 438. Cut corner 424 on badge 48 similarly cams detecting tip 434 out of the card passage. If badge 48 is inserted and manipulated past upper detector arm 420 with any of its other corners presented to the right side frame 40, the lower detector 428 will prevent incorrect insertion of the badge so that erroneous readings may be prevented.

Reset switches

Referring to FIGURE 6, an arm 450 on the right cam-out lever 118 underlies and bears on a transverse plate 452 pivoted at 454 on right side frame 40. Right unit reset switch 456 (normally open) is attached to side frame 40 and is positioned to be operated by plate 452. When cam-out lever 118 is in its restored or clockwise position as viewed in FIGURE 6, switch 456 is open. However, when cam-out lever 118 rotates counterclockwise, switch 456 closes. A similar switch 458 is provided mounted on left side frame 40 and is similarly operated by arm 459 on the left cam-out lever, as may be seen in FIGURE 1. Accordingly, when the badge reader is in the reset position, both of switches 456 and 458 are open but are closed at all other times.

The pawls-out switch

A pawls-out switch 460 is mounted on right side frame 40. An arm 462 is keyed onto pawl shaft 144 to the right of right side frame 40, and has mounted thereon an adjustable screw 464 for contacting and actuating the plunger 466 on pawls-out switch 460. Switch 460 is normally closed, i.e., it is closed in its unactuated condition as illustrated in FIGURE 16, wherein pawl shaft 144 is held in its clockwise position. Switch 460 opens when rollers 148 drop into notches 154, permitting pawl shaft 144 to rotate in the counterclockwise direction.

Accordingly, switch 460 determines when the pawls are clear of the notches 158 in sensing fingers 68, indicating that the sensing of fingers are freed for resetting by reset mechanism 54.

The off home switch

Situated at the upper front of the badge reader (FIGURES 6A, 6B and 7) is a cross-shaft 468 rotatably mounted in the two side frames 40. A transversely extending bail 470 is keyed onto shaft 468 and bears a series of transversely extending arms 472, one of which bears on the upper front surface of each sensing finger 68. A spring 474 has one end attached to a switch operating arm 476 and its other end attached to side frame 40, for urging arms 472 towards sensing fingers 68. Switch operating arm 476 is keyed on shaft 468, and is mounted outside of right frame 40. Normally open switch 478 has its operating plunger 480 mounted in the path of movement of operating arm 476, whereby rotation of shaft 468 in the counterclockise direction as viewed in FIGURE 7 causes operating of switch 478. In the reset condition of the badge reader, as illustrated in FIGURE 7, switch 478 is open, indicating that the sensing fingers 68 are still positioned on and supported by bail 112. When sensing fingers 68 are not in the restored position (FIGURE 9), bail 470 and shaft 468 rotate counterclockwise, closing switch 478.

In case it is desired to use less than the full array of sensing fingers 68, selected fingers 68 may be blocked from rearward movement upon unlatching by means such as the wire clip 469 illustrated in FIGURE 6B, inserted through a suitable aperture or notch in the selected finger 68 so as to abut the forward edge of stack-up element 58 and prevent rearward movement. When this is done, the individual arms 472 corresponding to the blocked sensing fingers 68 may be removed by loosening plate 471 (see FIGURE 6A), thus permitting bail 470 and the remaining arms 472 to detect when the unblocked sensing fingers 68 are not in the restored position, as described above.

The lockable code dial

An adjustable transaction code dial 484 is provided to transmit additional information other than that contained on the badge, and as viewed in FIGURE 1, may be located adjacent the badge reader. The structure of transaction code dial 484 is shown in FIGURES 23–25. Referring to FIGURE 23, dial 484 comprises generally a rotary switch assembly 486, a handle 488, and a locking mechanism 490 connecting handle 488 to switch 486 for preventing rotation of rotary switch assembly 486 without the use of a key 492. Rotary switch 486 is operated or rotated by shaft 494 journalled in a plate 496, one end of shaft 494 having flattened sides mating with a slot 498 in lock barrel 500. Handle 488 is rigidly secured to lock barrel 500 by a plurality of set screws 502. Accordingly, handle 488 can turn shaft 494 only when lock barrel 500 is freed to rotate. A ring 504 is rigidly secured to plate 496 surrounding lock barrel 500, and has radially extending therethrough a plurality of screws 506. Lock barrel 500 has protruding therefrom a bolt 508 which is normally positioned between a pair of screws 506, effectively locking lock barrel 500 against rotation.

Bolt 508 is mounted on a slidable plunger 510 (FIGURE 24) slidably mounted inside lock barrel 500. A coil spring 512 continuously biases block 510 and bolt 508 outwardly. A conventional lock assembly 514 (which may be of the pin-tumbler type) has protruding therefrom a stud 516 fitting into a slot 518 in block 510. Stud 516 is offset from the axis of rotation of lock assembly 514, whereby upon rotation of assembly 514 by key 492 stud 516 cams block 510 downwardly, lowering bolt 508 far enough to clear the tips of screws 506. This frees barrel 500 and handle 488 for rotation, whereby shaft 494 may be rotated by handle 488. One or more of screws 506 may be omitted to permit limited changes in the code without the use of key 492.

A suitable rotary switch assembly 486 is illustrated in FIGURE 25. Assembled on shaft 494 behind plate 496 is an insulating housing 520 having a notch 522 on its rear periphery. A stationary conductive detent member 524 has a tab 526 extending through notch 522, the interfitting between tab 526 and notch 522 preventing detent member 524 from rotating. The rear surface of detent member 524 is formed into a plurality of spaced detents. An insulating block 528 having a rectangular slot 530 formed therein is assembled on the flattened end 532 of shaft 494. A metallic ring 534 having a protrusion 536 for mating with the detents in detent member 524 is secured to the front face of rotary block 528. A similar ring 538 is secured to the rear surface of block 528, and carries thereon a movable contact 540. Rings 534 and 538 are electrically connected, as by rivets 541. A switch housing 542 fits over block 528 and detent member 524, and includes a keying protuberance 544 which mates with notch 522 in housing 520. A plurality of stationary contacts 546 are secured to the end or bottom surface of housing 542, for engagement with contact 540. Contacts 546 are connected with a plurality of radially extending tabs 548 mounted on the reader housing 542, and provide therewith means for connecting contact 540 to one of contacts 546.

The control and reading circuitry

Figure 27:
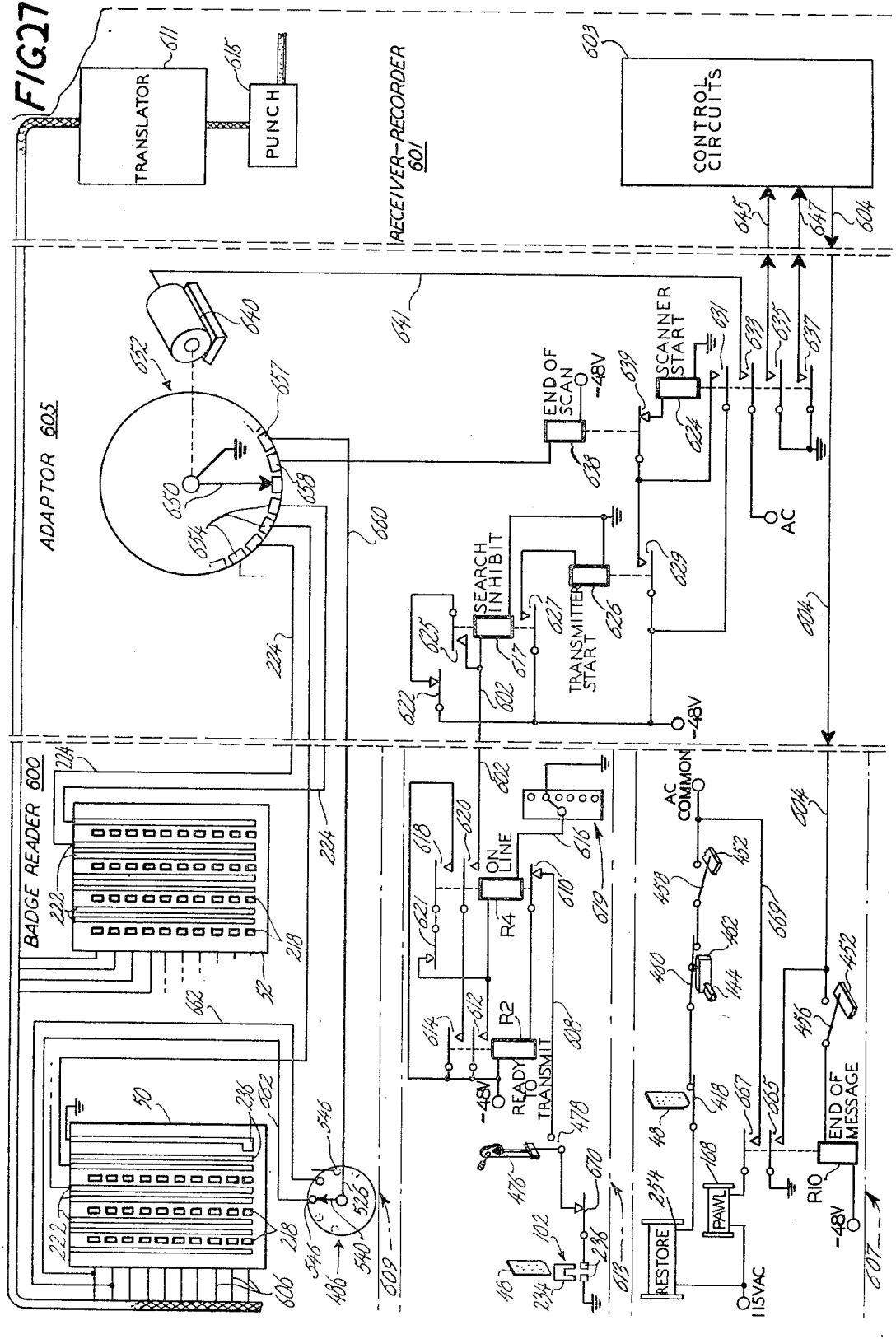
FIGURE 27 is a schematic diagram of the circuitry employed for reading the badge data and for controlling the operation of the badge reader.

An illustrative processing circuit for sequencing the badge reader message and for electrically encoding the information represented by the vertical position of its sensing finger brushes is shown in FIGURE 27, wherein the circuitry within the dotted area 600 may be installed as the box labelled "control circuits" (Transmitter) in FIGURE 4A, and wherein the dotted area labelled 601 represents the Receiver-Recorder disclosed in FIGURES 4B, 4C and 4D of the above-noted Reynolds et al. application. The box numbered 603 within area 601 and entitled Control Circuits is equivalent to box 90 and labelled Control Circuits (Receiver-Recorder) in FIGURE 4B of that application. Relays R2, R4 and R10 located in the badge reader perform a similar function as the like designated relays of FIGURE 4A of the Reynolds et al. application. Dotted area 605 represents an adaptor which may be located in a convenient area between one or more badge readers.

Connecting area 600 and adaptor 605 is a ready-to-transmit conductor 602 under control of relay R2 which is energized in a manner to be subsequently explained. Connecting area 601 and 600 is an end of message conductor 604 for controlling the end of message relay R10. A plurality of Hollerith lines 606 for transmitting data to be recorded may be connected in parallel with the Hollerith lines in the same Reynolds et al. application. Lines 606 extend from the badge reader, through the adaptor 605 and into the Receiver-Recorder 601 where they connect to a translator 611. The data entering the translator is processed and fed to a punch 615 in a manner fully described in the above application.

The circuitry within area 600 performs three functions: the switch and solenoid circuit 607 resets the badge reader at the end of a message; the reading circuit 609 converts the physical position of the sensing fingers 68 into a Hollerith code; and the circuit 613 initiates a message transmission.

As hereinbefore explained, lowering of card 48 causes bridging of contacts 236 by control finger brush 162. Moreover it will be remembered that if each of the sensing fingers have sensed a hole in its respective column of the card, switch 478 will be closed. A ground signal will then be transmitted over line 608, through normally closed switch 610 of relay R4. Such signal completes a circuit that energizes ready-to-transmit relay R2 whereupon its points 612 and 614 close. Closure of points 612 condition a circuit to On Line relay R4 while points 614 condition a circuit to a search inhibit relay 617 located in the adaptor 605. When the search unit 619 (fully explained in the hereinbefore Reynolds et al. application) locates the calling badge reader, a ground signal completes a circuit to relay R4 via line 616 and the now closed points 612 whereupon it energizes, closes its points 618, 620 and opens its points 610. Closure of points 618 completes a holding circuit for relay R4 via normally closed point 621 of relay R10. Closing of points 620 effects energization of search inhibit relay 617 located in the adaptor via the now closed points 614. Opening of points 610 drops out ready-to-transmit relay R2.

Energization of search inhibit relay 617 causes points 625 and 627 thereof to close. Closure of points 625 establishes a holding circuit for relay 617 via normally closed points 622 of a scanner start relay 624.

Points 627 of relay 617 establish a circuit to a transmitter start relay 626 which when energized closes its points 629 whereupon the scanner start relay 624 energizes and closes its points 631, 633, 635 and 637 while opening its points 622. Opening of points 622 drops out relay 617 which in turn drops out relay 626. Closed points 631 provide a holding circuit for relay 624 via the normally closed points 639 of an end of scan relay 638. Points 633 provide a path for AC power to a scanner motor 640 via line 641. Closed points 635 and 637 transmit a ground signal over lines 645 and 647 which are connected to the control circuits 603 of the receiver-recorder. Conductors 645 and 647 are the character gate and transmitter message gate lines, respectively, their function being fully disclosed in the above mentioned Reynolds et al. application.

Energization of motor 640 rotates a grounded wiper finger 650 of a scanner 652 over a plurality of conductive segments 654. Segments 654 are connected to individual conductors 224 (see FIGURE 13), alternate segments 654 being connected to alternate printed circuit boards 50 and 52, i.e., odd numbered segments 654 may be connected to printed circuit board 50 and even numbered segments 654 may be connected to printed circuit board 52. Accordingly, grounded scanner wiper 650 sequentially applies a ground to each of the conductive strips 222 on the printed circuit boards. As each conductive strip is grounded, a ground will be applied on one of the Hollerith lines 606, depending upon the position of the brush assembly 94 associated with each individual conductive strip 222 and contacts 218.

After each of the conductive segments 654 which are connected to conductors 224 have been scanned by finger 650, said finger then wipes over conductive segments 657 and 658. Segment 657 is connected by a conductor 660 to a common terminal 526 of the transaction code dial rotary switch 486. As hereinbefore described in connection with FIGURE 25, a circuit is completed from terminal 526 through movable contact 540 to one of a plurality of contacts 546. Contacts 546 are connected through a plurality of conductors 662 to the corresponding Hollerith lines 606. Accordingly, when rotary arm 650 wipes segment 657, a ground is applied through conductor 660 and rotary switch 486 to one of the Hollerith lines, constituting an additional bit of information beyond that contained on the badge 48. If more than one additional bit of information is desired, additional contacts 657 and rotary switches 486 may be supplied.

An end of scan segment 658 is provided to indicate that wiper finger 650 has transmitted all the desired information. As finger 650 contacts segment 658 a circuit is completed to the end of scan relay 638 which energizes and opens its points 639 whereupon relay 624 deenergizes. As a result, scanner motor 640 drops out and the ground signal is removed from the character gate and transmitter message gate lines 645 and 647, respectively. Drop of the transmitter gate line signal will cause the receiver-recorder to generate an end of message signal, as fully explained in the referred to Reynolds et al. application, via line 604, the now closed switch 456 and cause energization of the end of message relay R10 located in the badge reader 600. Relay R10 then closes its points 665 and 667 and opens points 621 and 670. Opening of points 621 drops out on line relay R4 while opening of points 670 prevents reenergization of transmit relay R2 until the badge reader mechanism is fully reset. Closed points 665 establish a holding circuit for relay R10 through reset switch 456.

Upon closure of points 667 pawl solenoid 168 energizes via conductor 669 and rotates shaft 144 and arm 462 clockwise, closing switch 460 and releasing pin 178 of the card locking mechanism (should that mechanism be incorporated, as hereinbefore explained), as illustrated in FIGURE 16. Badge 48 may now be removed and allow corner cut detector switch 418 to close. A circuit to restore solenoid 254 is now completed via the AC common conductor, the now closed switch 458, closed switches 460 and 418 to the 115 VAC line. The badge reader mechanism is then reset to the FIGURE 7 position whereupon reset switches 456, 458 open to the condition shown in FIGURE 27. Opening of switch 458 deenergizes restore solenoid 254 while opening of switch 456 drops out relay R10. Points 621 and 670 now close and return the badge reader to normal position ready to accept a new badge and transmit its message.

*Normal operation-card insertion*

A badge 48 inserted into slot 46 with its cut corner at the right side of the badge reader will pass the corner detectors 420 and 434. (See FIGURE 26.) As the cut corner 424 cams upper corner detector 420 out of the card passage, switch 418 is opened, preventing energization of restore solenoid 254 while the badge 48 is in the badge reader.

The descending badge engages tabs 96 on control fingers 66, just clearing sensing tips 98 on sensing fingers 68. Further pressure on badge 48 causes control fingers 66 to descend, guided by the passages in the stack-up 56.

Referring to FIGURE 6, as control fingers 66 descend, control cross-shaft 86 and control link 104 lower therewith. The first downward movement of control fingers 66 also unlatches latch element 126. Latch studs 82 mounted on control fingers 66, bearing on curved cams 142, rotate the latch elements 128 against the urging of springs 130, lowering arms 134 sufficiently for latch tabs 140 to clear the upper edges of notches 136.

As illustrated in FIGURES 8 and 9, this unlatching of latches 126 permits cam-out levers 118 to rotate about pivot studs 120 under the urging of springs 123. Rotation of cam-out levers 118 closes switches 456 and 458.

Latch shaft 114, carried in aperture 117 in cam-out levers 118, moves rearwardly in slots 116 in sensing fingers 68, releasing the upper ends of sensing fingers 68. Sensing fingers 68 pivot rearwardly about their pivot studs 88, their sensing tips 98 bearing on the forward surface of badge 48. Before each sensing tip enters its corresponding hole 100 in badge 48, the sensing fingers are retained at their uppermost position by shoulders 110 resting on transverse bail 112. As each individual sensing tip 98 drops into the corresponding data hole 100, the sensing fingers 68 pivot further to the rear sufficiently for their shoulders 110 to clear bail 112, freeing sensing fingers 68 for downward movement with badge 48. As the last sensing finger 68 clears bail 112, bail 470 rotates rearwardly, allowing switch 478 to close.

Referring to FIGURES 10–12, the first small downward movement of control fingers 66 causes control link 104 to lower. The brush control rods 108 and 109 carried by control link 104 lower away from brush assemblies 94, permitting the brush assemblies to pivot their respective bifurcated brushes against printed circuit boards 50 and 52.

The sensing fingers 68 are individually vertically positioned within the badge reader a distance corresponding to the position of its corresponding data hole 100. During the downward movement of sensing fingers 68, bifurcated brushes 208 sweep downwardly on the respective printed circuit boards 50 and 52.

While the sensing fingers 68 and control fingers 66 are being lowered, rollers 148 on pawl control arms 146 bear on the forward surfaces of control fingers 66, holding pawls 156 disengaged from notches 158 on the sensing fingers 68 until rollers 148 drop into notches 154 on control fingers 66 (FIGURE 16).

As the badge is fully inserted and control fingers 66 reach their lowermost limit of travel, rollers 148 drop into notches 154 on control fingers 66, permitting pawl shaft 144 to rotate counterclockwise as viewed in FIGURE 16. This rotation of pawl shaft 144 rotates pawl 156 rearwardly, engaging notches 158 on sensing fingers 68 and positively locks sensing fingers 68 into position for the reading operation. Switch 460 opens, preventing operation of the restoring mechanism 54 while the pawls are engaged. Rotation of pawl shaft 144, links 174 and 194, permits optional card lock pin 178 to move forwardly under the urging of spring 182 with the forward end of lock pin 178 extending through card lock aperture 186 in badge 48, locking the badge during the reading operation.

Referring to FIGURES 15 and 16, near the lowermost limit of travel of control cross-shaft 86, roller 246 mounted adjacent the left side frame 40 engages portions 300 of spring 292, spreading the spring sufficiently to disengage hooked portions 294 from notches 298 in control slide 280. This permits control slide 280 to lower under the urging of spring 302 (FIGURE 14). Lowering of control slide 280, by disengaging tab 404 from crank 402, permits spring 396 to urge card gate 390 into contact with the rear surface of badge 48.

The lowering of control slide 280, in the embodiment illustrated in FIGURE 17, by withdrawing finger 332 permits anti-in cam 324 to rotate into engagement with the edge of the badge.

In the modification illustrated in FIGURES 19 through 22, lowering of control slide 280 rotates shaft 346 by rack gear 340 and pinion gear 348, disengaging anti-out cam 364 and engaging anti-in cams 350.

Referring to FIGURE 16, as control fingers 66 reach their lowermost limit of downward travel, lobe 228 on the brush assembly 102 carried by the right control finger 66 drops into notch 226 in the stack-up elements, permitting bifurcated brush 234 to be rotated into engagement with contacts 236 on front printed circuit board 50. Bridging of contacts 236 by bifurcated brush 234 indicates that the badge is fully inserted and ready to be read.

*The reading operation*

Referring now to FIGURE 27, if all the sensing fingers 68 have cleared bail 112, switch 478 will be closed. Accordingly, the bridging of contacts 236 by bifurcated brush 234 on right control finger 66 will energize ready-to-transmit relay R2. As fully explained above this will eventually cause relay 624 to energize and complete a circuit (via switch 633) to the scanner motor 640 which drives grounded scanner wiper finger 650. Finger 650 sequentially scans segments 654 and 657 causing the information contained on the printed circuit boards 50 and 52 and the code dial 486 to be transmitted as a Hollerith code on lines 606 to the receiver-recorder 601. After the last information segment has been scanned, finger 654 grounds segment 658 completing a circuit for energization of end of scan relay 638, whereupon points 639 thereof open. Opening of points 639 drops relay 624 which causes an end of message signal to be sent from the control circuits 603 and over line 604, as explained hereinbefore and more fully disclosed in the referred to Reynolds et al. application. Thus the scanner motor deenergizes (points 633 open), the wiper finger 650 stops on a blank or home position segment and the badge reader resets to start position.

*The restoring operation*

Energization of pawl solenoid 168 by the end of message signal over line 604 rotates pawl shaft 144 clockwise as viewed in FIGURE 16, releasing pawls 156 from notches 158. This frees sensing fingers 68 for restoring to the reset position by restore solenoid 254. Rotation of pawl shaft 144 also closes pawls out switch 460 and withdraws card lock pin 178, freeing badge 48 for upward movement. At this stage, right and left unit reset switches 456 and 458 are closed, and card-in switch 418 is open.

When badge 48 is removed from the badge reader switch 418 closes, completing the circuit for energizing restore solenoid 254. Restore solenoid 254 withdraws its armature and rotates cam 250 clockwise as viewed in FIGURE 15. Rotation of cam 250 raises control cross-shaft 86. The first small upward movement of control cross-shaft 86 disengages roller 246 from spring portions 300, permitting hooks 294 to bear on surfaces 296 of control slide 280.

As control cross-shaft 86 raises, lobe 228 on brush assembly 102 cams brush assembly 102 counterclockwise as viewed in FIGURE 16, lifting bifurcated brush 234 from the surface of the printed circuit board 50. Referring to FIGURE 12, rear brush control rod 108 and front brush control rod 109 engage the lower inclined surfaces of sensing finger brush assemblies 94, rotating them upwardly and disengaging bifurcated brushes 208 from printed circuit boards 50 and 52. Immediately thereafter, control cross-shaft 86 engages the lower surfaces of sensing fingers 68, raising the sensing fingers.

As cross-shaft 86 nears the upper limit of its travel, stud 82 carried by the control finger 66 engages the lower inclined surface of cam arm 142, rotating latch element 128 clockwise (FIGURE 9). As latch stud 82 continues to rise, sensing fingers 68 are raised with their notches 116 surrounding latch shaft 114 (FIGURE 8) and latch arm 134 engages the lower surface of tab 140. As sensing fingers 68 near their uppermost position, upper surface 124 on control link 104 engages inclined lower leg 122 on cam-out lever 118 rotating cam-out lever 118 clockwise. Clockwise rotation of cam-out lever 118 carries latch shaft 114 toward the front of the badge reader. Latch shaft 114 engages the forward edges of notches 116 in sensing fingers 68 and moves sensing fingers 68 toward the front of the badge reader. The front edges of shoulders 110 engage and rotate bail 112 clockwise against the urging of spring 115 as viewed in FIGURE 8. As bail 112 pivots clockwise, its upper surface lowers until it is below shoulders 110, after which time bail 112 supports shoulders 110. When latch shaft 114 reaches the forward extent of its travel, latch arm 134 is rotated by spring 130 in a counter-clockwise direction, engaging notch 136 with latch tab 140. At this time, right and left unit reset switches 456 and 458 open, deenergizing restore solenoid 254 and pawls solenoid 168.

As control cross-shaft 86 nears the upper limit of its travel, roller 246 on the left side of the badge reader engages the upper surface of elongated slot 286 in control slide 280, raising slide 280. (See FIGURES 14 and 15.) Referring to FIGURE 17, tab 404 on control slide 280 engages crank 402, rotating card gate 390 rearwardly out of the badge passageway. In the embodiment shown in FIGURES 17 and 18, finger 332 on control slide 280 engages tab 330 on anti-in cam 324, and rotates cam 324 outwardly to the reset position. In the alternative embodiment illustrated in FIGURE 19, raising of control slide 280 rotates shaft 346 by rack 340 and pinion 348 in a counterclockwise direction, removing anti-in cams 350 from the badge passage and as illustrated in FIGURE 20, positioning anti-out cam 364 in the passage.

Accordingly, it may be seen that the card-reader as above disclosed is particularly adapted for use as an attendance recorder, wherein the workman's badge also performs the function of a time card. The badge reader may be readily incorporated into existing conventional data collection systems to provide rapid transmission of pertinent data to a central location. The badge reader as above disclosed is quite compact and requires much less space than existing time-clock systems. The badge corner detectors, anti-in and anti-out cams, and the card gate, together with several other novel features, prevent deliberate or accidental errors in manipulation of the inserted card, and accordingly insure accurate electrical encoding of the punched data on the card. The fact that a portion of the card or badge may be held in the hand of the operator during the entire reading operation provides an important time saving which is not possible when the operator must release the card upon insertion and then grasp the card again after the card has been read.

It will thus be seen that the objects set forth above, among those made apparent from the preceding description, are efficiently attained and, since certain changes may be made in the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. A card-reading mechanism, comprising in combination, means defining a slot communicating with a chamber for receiving and guiding a card to be read, a plurality of sensing fingers having tips at one end for engagement with indicia on said card, guide means for supporting said sensing fingers for movement parallel to the path of travel of said card in said chamber, the movement of said sensing fingers being in response to the movement of said card in said chamber, said sensing fingers further being pivotally supported at a distance from said tips, means urging said tips toward said chamber, and releasable latching means for supporting said fingers with said tips disposed adjacent said chamber and near the entrance to said chamber, at least one control finger having a contact member positioned in said chamber near said slot for engagement with the entering edge of said card, means supporting said control finger for movement parallel to the path of travel of said card in said chamber, and unlatching means controlled by movement of said control finger for releasing said sensing fingers from said latching means, whereby said tips of said sensing fingers pivot into contact with said card.

2. The combination of claim 1, further comprising encoding means for electrically encoding the moved positions of said sensing fingers, a scanner for electrically reading the encoded information, and actuating means for said scanner responsive to full insertion of said card in said chamber to initiate operation of said scanner.

3. The combination of claim 2, further comprising reset means, responsive to removal of said card, to restore said tips of said sensing fingers and said contact member of said control finger to their restored positions near the entrance to said chamber.

4. The combination of claim 1, wherein said latching means comprises a transverse member positioned between a portion of said sensing fingers and said chamber, means connected to said control finger for moving said transverse member in the direction of said chamber to release said sensing fingers for engagement with said card upon lowering of said control finger, and means connected to said control finger for moving said transverse member into engagement with said sensing fingers upon resetting of said control finger.

5. The combination of claim 4, further comprising shoulders on said sensing fingers, and means engaging said shoulders for preventing said sensing fingers from moving in the direction of movement of said card before said sensing tips engage said indicia.

6. The combination of claim 4, further comprising detecting means disposed in said chamber near the entrance to said chamber for permitting entry of said card only when said card is presented to said sensing finger tips in a predetermined positional relationship.

7. The combination of claim 6, wherein said detecting means comprises an arm, spring urged into said chamber to be engaged by a first corner of said card, and wherein said first corner has an inclined surface for camming said arm out of said chamber.

8. A card-reading mechanism for electrically reading punched cards, said cards containing information arranged in laterally spaced columns having data in the form of the longitudinal position of a data aperture in each column, the combination comprising, means defining a housing having a slot communication with an elongated reading chamber for receiving and guiding said card parallel to said data columns, a plurality of sensing elements disposed within said housing and aligned with said columns, each of said sensing elements having formed thereon a sensing tip for engagement with the data apertures on said card, said sensing tips being individually resiliently urged toward said chamber, and guide means for supporting said sensing elements for individual movement parallel to the path of travel of said card in said chamber in response to the movement of said card in said chamber, releasable latching means for supporting said sensing elements in restored positions with said tips disposed adjacent said chamber near said slot, at least one control member for detecting entry of a card in said chamber, and releasing means controlled by said control member for releasing said latching means, whereby said sensing tips are freed for movement into contact with the surface of said card.

9. The combination of claim 8 wherein said control means comprises an engagement member positioned in said card chamber near said slot for engagement with the edge of said card, said control means further comprising guide means for supporting said engagement member for movement parallel to the path of travel of said card in said passage, and wherein said releasing means is controlled by movement of said engagement means away from said slot for releasing said latching means.

10. The combination of claim 8, further comprising restoring means for resetting said sensing elements and said control means to restored positions.

11. The combination of claim 10, further comprising means for preventing operation of said restoring means while said card is in said chamber.

12. A card-reading mechanism for electrically reading punched cards, said cards containing information arranged in laterally spaced columns having data in the form of the longitudinal position of a data aperture in each column, the combination comprising, means defining a housing having a slot communicating with an elongated reading chamber for receiving and guiding said card parallel to said data columns, a plurality of sensing elements disposed within said housing and aligned with said columns, each of said sensing elements having formed thereon a sensing tip for engagement with the data apertures on said card, said sensing tips being individually resiliently urged toward said chamber, and guide means for supporting said sensing elements for individual movement parallel to the path of travel of said card in said chamber in response to the movement of said card in said chamber, releasable locking means responsive to full insertion of said card for locking said sensing elements during the reading operation.

13. The combination of claim 12, further comprising releasing means responsive to completion of the reading operation to release said locking means.

14. Mechanism for assuring proper orientation of a generally rectangular data card in a longitudinal passageway, said data card having one corner cut at an angle to present an inclined edge, comprising a card blocking member extending into one side of said passageway so as to engage a corner of the card, said blocking member being supported for movement perpendicular to said passageway and resiliently urged toward said passageway, whereby when said card is properly oriented said inclined edge engages and cams said blocking member out of said passageway.

15. A card-reading mechanism comprising a longitudinally extending chamber for receiving a portion of a card to be read, and means to prevent partial insertion of said card, comprising, a pivot shaft mounted adjacent said chamber and an anti-out cam mounted on said pivot shaft and resiliently urged into said chamber to engage a surface of said card at a point further from the entrance to said chamber than the point on said card nearest said shaft.

16. The combination defined in claim 15 further comprising means responsive to full insertion of said card in said chamber for disengaging said cam from the surface of said card, whereby said card may be removed from said chamber.

17. A card reading mechanism comprising a slot communicating with a longitudinally extending chamber for receiving a portion of a card to be read, and card control means to prevent withdrawal of said card prior to its complete insertion into said chamber, said card control means comprising a pivot shaft mounted adjacent said chamber and a cam mounted on said pivot shaft and resiliently urged into said chamber to engage a surface of said card further from said slot than a point on said card nearest said pivot shaft.

18. In a card-reading mechanism comprising a slot communicating with an aligned longitudinally extending chamber for receiving a portion of a card to be read, control means for detecting when said card is fully inserted in said chamber, a pivot shaft mounted adjacent said chamber near said slot, a cam mounted on said pivot shaft and resiliently urged into said chamber to engage a surface of said card nearer said slot than a point on said card nearest said pivot shaft, latch means for retaining said cam rotated out of engagement with the surface of said card, and releasing means responsive to said control means for releasing said latch when said card is fully inserted in said chamber, whereby when said card is fully inserted, said releasing means unlatches said latch means, permitting said cam to pivot into engagement with said card.

19. A card-reading mechanism wherein a plurality of data sensing elements are individually repositioned from a reset position to a read position by engagement with data apertures as said card is inserted in a reading chamber, sensing means to detect when all said sensing elements have left the reset position, a scanner for electrically reading from the positions of the sensing elements the data on the card, and actuating means for said scanner, said actuating means being responsive to full insertion of said card in said chamber and to said sensing means.

20. The combination defined in claim 19, further comprising an auxiliary manually positionable lockable switch for encoding further information not contained on said card, said switch being connected to be read by said scanner.

References Cited

UNITED STATES PATENTS

| | | | |
|---|---|---|---|
| 2,072,447 | 3/1937 | Gray | 235—61.113 |
| 2,591,448 | 4/1952 | Lorenz | 235—61.8 |
| 2,192,695 | 3/1940 | Rainey | 235—61.112 |
| 1,750,191 | 3/1930 | Peirce | 235—61.112 |
| 2,169,213 | 3/1930 | Backdahl | 235—61.112 |
| 2,869,790 | 1/1959 | Radke et al. | 235—61.11(3) |

DARYL W. COOK, Primary Examiner.

J. F. MILLER, Assistant Examiner.